(12) United States Patent
Schreder et al.

(10) Patent No.: US 12,410,088 B2
(45) Date of Patent: Sep. 9, 2025

(54) OPTICAL COMPONENT AND GLASS COMPOSITION AS WELL AS USE THEREOF

(71) Applicant: Schott AG, Mainz (DE)

(72) Inventors: Bianca Schreder, Sulzbach (DE); Ute Wölfel, Mainz (DE); Stephanie Hansen, Gensingen (DE); Ralf Biertümpfel, Mainz-Kastel (DE)

(73) Assignee: Schott AG, Federal Repuuilc of (DE)

( * ) Notice: Subject to any disclaimer, the term of this patent is extended or adjusted under 35 U.S.C. 154(b) by 534 days.

(21) Appl. No.: 17/127,137

(22) Filed: Dec. 18, 2020

(65) Prior Publication Data
US 2021/0191014 A1 Jun. 24, 2021

(30) Foreign Application Priority Data

Dec. 20, 2019 (EP) ..................... 19401057
Aug. 25, 2020 (DE) ............... 10 2020 122 220.3

(51) Int. Cl.
| | | |
|---|---|---|
| *C03C 3/076* | (2006.01) | |
| *C03C 3/083* | (2006.01) | |
| *C03C 3/085* | (2006.01) | |
| *C03C 3/091* | (2006.01) | |
| *C03C 3/093* | (2006.01) | |
| *C03C 4/02* | (2006.01) | |
| *C03C 4/10* | (2006.01) | |
| C03C 21/00 | (2006.01) | |
| G01S 7/481 | (2006.01) | |
| G01S 17/931 | (2020.01) | |
| G02B 5/20 | (2006.01) | |
| G02B 5/22 | (2006.01) | |

(52) U.S. Cl.
CPC .............. *C03C 3/076* (2013.01); *C03C 3/083* (2013.01); *C03C 3/085* (2013.01); *C03C 3/091* (2013.01); *C03C 3/093* (2013.01); *C03C 4/02* (2013.01); *C03C 4/10* (2013.01); C03C 21/002 (2013.01); C03C 2203/10 (2013.01); C03C 2203/50 (2013.01); *G01S 7/4813* (2013.01); *G01S 17/931* (2020.01); *G02B 5/208* (2013.01); *G02B 5/226* (2013.01)

(58) Field of Classification Search
CPC ......... C03C 3/091; C03C 3/093; C03C 3/085; C03C 3/083; C03C 3/076; C03C 4/02
See application file for complete search history.

(56) References Cited

U.S. PATENT DOCUMENTS

| | | |
|---|---|---|
| 5,366,940 A | 11/1994 | Bolton et al. |
| 5,438,024 A | 8/1995 | Bolton et al. |
| 10,455,167 B2 | 10/2019 | Inoguchi |
| 2016/0031747 A1 | 2/2016 | Yamamoto et al. |
| 2017/0217825 A1 | 8/2017 | Hasegawa et al. |

FOREIGN PATENT DOCUMENTS

| | | |
|---|---|---|
| WO | 2019/009336 A1 | 1/2019 |
| WO | 2019/030106 A1 | 2/2019 |
| WO | 2019/065643 A1 | 4/2019 |

OTHER PUBLICATIONS

Chinese Office Action dated Jun. 1, 2023 for Chinese Patent Application No. 202011495069.8 (8 pages).
Extended European Search Report dated Jun. 24, 2020 for European Patent Application No. 19 40 1057 (7 pages).

*Primary Examiner* — Elizabeth A. Bolden
(74) *Attorney, Agent, or Firm* — TAYLOR & EDELSTEIN, PC

(57) ABSTRACT

A glass includes cations of the following components in the indicated amounts (molar proportion in cat.-%): 30-80 cat.-% silicon; 0-20 cat.-% boron; 0-2 cat.-% aluminum; 5-35 cat.-% sodium; 2-25 cat.-% potassium; 0-0.5 cat.-% nickel; 0-0.5 cat.-% chromium; and 0.03-0.5 cat.-% cobalt. A sum of the molar proportions of cations of sodium and potassium is in a range of from 15 to 50 cat.-%, a sum of the molar proportions of cations of nickel and chromium is in a range of from 0.1 to 0.5 cat.-%, and a ratio of the sum of the molar proportions of cations of sodium and potassium to the sum of the molar proportions of cations of nickel and chromium is in a range of from 70:1 to 200:1.

20 Claims, 3 Drawing Sheets

OPTICAL COMPONENT AND GLASS COMPOSITION AS WELL AS USE THEREOF

CROSS REFERENCE TO RELATED APPLICATIONS

This application claims priority to European Patent Application EP 19401057.5 filed on Dec. 20, 2019, and German Patent Application DE 10 2020 122 220.3, filed on Aug. 25, 2020, which are both incorporated herein by reference.

BACKGROUND OF THE INVENTION

1. Field of the Invention

The present invention relates to a glass composition and a glass article such as an optical component having a low transmission in the visible range and a high transmission in the near-infrared (NIR) range. The present invention also relates to uses thereof, in particular in the automotive sector.

2. Description of the Related Art

Glasses having a low transmission in the visible range are often referred to as "black glass" due to their black appearance. However, common black glass generally has a transmission that is high enough to allow visual inspection of structures positioned behind the glass, unless the glass is provided with a comparably high thickness. In particular when used at low thickness, common black glasses do not appear to be entirely black, i.e. they do not have a neutrally black color impression. Rather, they often give rise to a dark blue or dark green color impression. Furthermore, black glasses often comprise toxic components that are not acceptable in many fields of application.

In view of the disadvantages described above, it is not surprising that potential applications of black glasses have been limited to certain narrow fields, in particular to applications in which a high thickness was acceptable as it was not experienced as a major disadvantage.

However, in order to open up new fields of application, the above-discussed disadvantages have to be overcome. For example, an accordingly improved black glass that additionally has a high transmission in the NIR range may be advantageously used as an optical component or band-pass filter in applications comprising NIR lasers. Interestingly, the number of such applications has drastically increased in recent years, in particular for optical measurements of distance and/or speed. Commonly known is a method that is often referred to as LiDAR (Light Detection And Ranging) or sometimes also as LaDAR (Laser Detection And Ranging). LiDAR systems generally work by emitting laser light in the NIR spectrum, in particular having wavelengths of more than 780 nm. Such laser light is reflected from objects in the surrounding at least partially back into the LiDAR system and detected there. Based on the pattern of the reflected laser light, the LiDAR system may recognize objects. Based on the Time of Flight, the LiDAR system may determine the distance of objects. Some LiDAR systems may determine the speed of objects based on phase relationship of emitted and reflected laser light.

LiDAR systems are, for example, required for autonomous driving. However, there are plenty additional fields of application, in particular robotics, drones, satellites, marine, mining, construction, railways and so on.

LiDAR systems require an optical window positioned between the opto-electronic components of the system and the surroundings in order to provide protection against environmental impacts. Depending on the type of LiDAR system, such optical windows may be planar or curved. Commonly used are also spinning LiDAR systems in which emitter and detector rotate within a typically stationary ring window.

Commonly known LiDAR systems typically comprise optical windows made of polymeric materials, in particular materials such as polycarbonate (PC) or poly(methyl methacrylate) (PMMA). However, such materials have several disadvantages, in particular regarding scratch resistance, mechanical resistance and chemical resistance. Therefore, there have been attempts to use glass as material for such optical windows. For example, WO 2019/030106 A1 discloses a LiDAR system having a cover lens comprising a glass. However, the advantageous properties of the glasses provided according to the present invention that are chemically resistant glasses combining high transmission in the NIR range with low transmission in the visible range and have a neutrally black color impression are not achieved. The same holds true for WO 2019/065643 A1.

Furthermore, WO 2019/009336 A1 discloses a sensor module comprising a protective member being formed of strengthened glass. However, the glasses have a high transmission in the visible range.

SUMMARY OF THE INVENTION

The previously described prior art glasses do not have the advantageous properties of the glasses provided according to the present invention. The glass provided according to the present invention is characterized by particularly low transmission in the visible range. On the other hand, the transmission in the NIR-range is particularly high. Moreover, the glass provided according to the present invention is particularly color-neutral, i.e. it has a particularly neutrally black color impression. The glass may be free of components like Cr(VI) and/or $V_2O_5$ that are not desired in the automotive industry. Furthermore, the glass has a particularly high chemical stability and mechanical stability. In some embodiments, the glass provided according to the present invention can be processed very well by hot forming which is particularly advantageous for obtaining flat or ring-shaped optical components.

In some exemplary embodiments provided according to the present invention, a glass, such as an optical glass, comprises cations of the following components in the indicated amounts (molar proportion in cat.-%):

| Component | Proportion (cat.-%) |
|---|---|
| Silicon | 30-80 |
| Boron | 0-20 |
| Aluminum | 0-2 |
| Sodium | 5-35 |
| Potassium | 2-25 |
| Nickel | 0-0.5 |
| Chromium | 0-0.5 |
| Cobalt | 0.03-0.5 | a sum of the molar proportions of cations of sodium and potassium is in a range of from 15 to 50 cat.-%, a sum of the molar proportions of cations of nickel and chromium is in a range of from 0.1 to 0.5 cat.-% and a ratio of the sum of the molar proportions of cations of sodium and potassium to the sum of the molar proportions of cations of nickel and chromium is in a range of from 70:1 to 200:1.

In some exemplary embodiments provided according to the present invention, a glass article includes a glass and has a thickness in a range of from 1 mm to 5 mm. The glass comprises cations of the following components in the indicated amounts (molar proportion in cat.-%):

| Component | Proportion (cat.-%) |
|---|---|
| Silicon | 30-80 |
| Boron | 0-20 |
| Aluminum | 0-2 |
| Sodium | 5-35 |
| Potassium | 2-25 |
| Nickel | 0-0.5 |
| Chromium | 0-0.5 |
| Cobalt | 0.03-0.5 | a sum of the molar proportions of cations of sodium and potassium is in a range of from 15 to 50 cat.-%, a sum of the molar proportions of cations of nickel and chromium is in a range of from 0.1 to 0.5 cat.-% and a ratio of the sum of the molar proportions of cations of sodium and potassium to the sum of the molar proportions of cations of nickel and chromium is in a range of from 70:1 to 200:1.

In some exemplary embodiments provided according to the present invention, a method for producing a glass includes melting glass raw materials and cooling the melted glass raw materials to form the glass. The glass comprises cations of the following components in the indicated amounts (molar proportion in cat.-%):

| Component | Proportion (cat.-%) |
|---|---|
| Silicon | 30-80 |
| Boron | 0-20 |
| Aluminum | 0-2 |
| Sodium | 5-35 |
| Potassium | 2-25 |
| Nickel | 0-0.5 |
| Chromium | 0-0.5 |
| Cobalt | 0.03-0.5 | a sum of the molar proportions of cations of sodium and potassium is in a range of from 15 to 50 cat.-%, a sum of the molar proportions of cations of nickel and chromium is in a range of from 0.1 to 0.5 cat.-% and a ratio of the sum of the molar proportions of cations of sodium and potassium to the sum of the molar proportions of cations of nickel and chromium is in a range of from 70:1 to 200:1.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
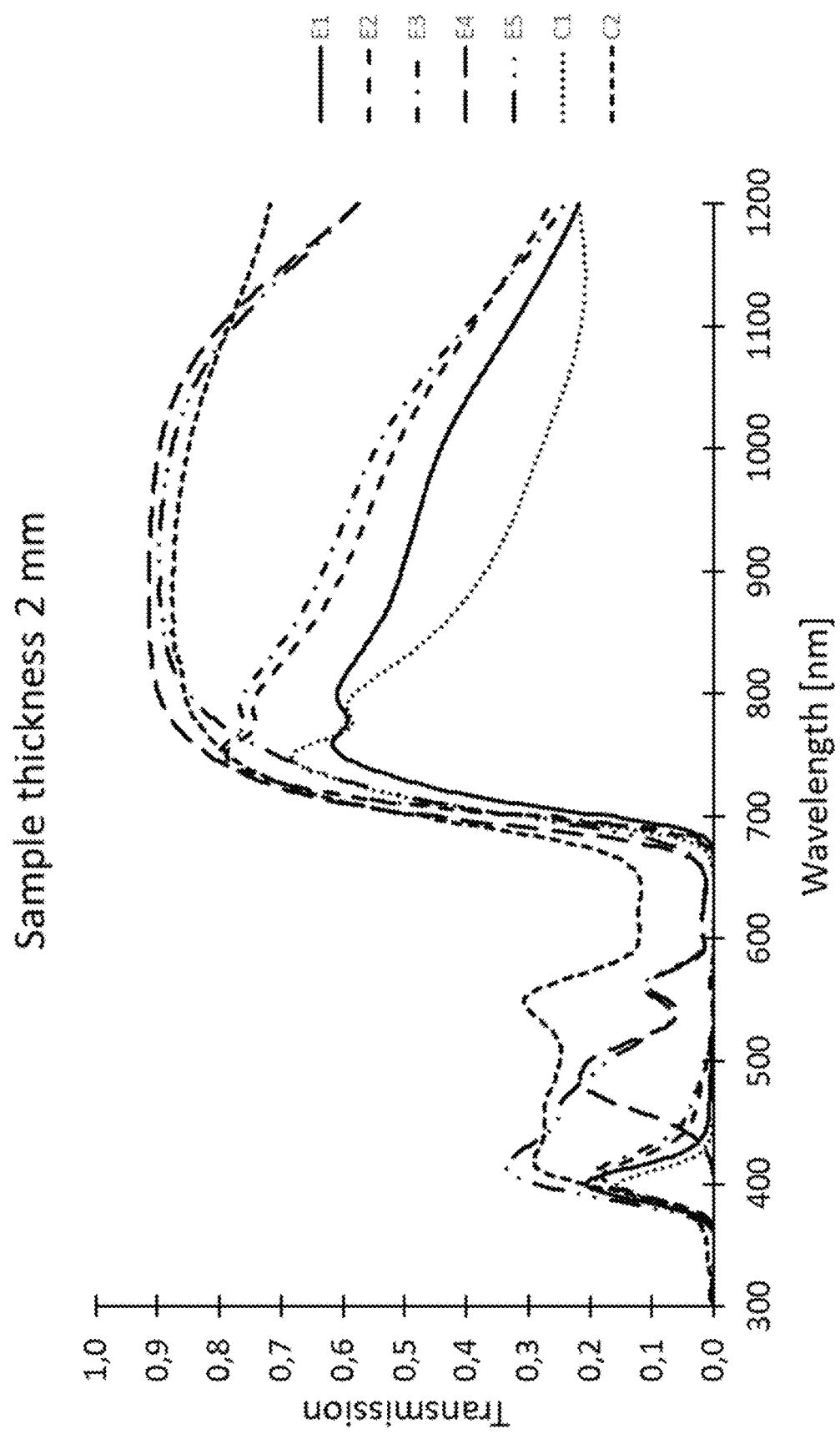
FIG. 1 illustrates the transmission of example glasses E1 to E5 as well as of comparative examples C1 and C2 in the wavelength range from 300 to 1200 nm for a sample thickness of 2 mm, with comparative example C1 having a comparably low transmission in the particularly relevant wavelength range of from 850 to 950 nm and comparative example C2 having a comparably high transmission in the visible range.

Exemplary embodiments provided according to the present invention are based to a large degree on the correct adjustment of the molar ratios of the cations to each other. Therefore, it is reasonable to characterize the glass composition by indications in cat.-%. The glass also comprises anions. However, the anions are less formative for the properties of the glass than the cations so that the core of the exemplary embodiments provided according to the present invention is more in the cation composition.

The term "cation percent" (abbreviated "cat.-%") relates to the relative molar proportions of the cations with regard to the total amount of cations in the glass. The glass also comprises anions, whose relative molar proportions in relation to the total amount of anions in the glass is herein indicated as "anion percent" (abbreviated "anion-%").

In addition to cations, the glass provided according to the present invention also comprises anions, which may be selected from the group consisting of $O^{2-}$, $F^-$, $Br^-$, $Cl^-$ und $SO_4^{2-}$. The molar proportion of $O^{2-}$ with regard to the anions may be at least 50% (anion-%), such as at least 70%, at least 90%, at least 98%, or at least 99%. In some embodiments, the glass is entirely oxidic, it thus contains only $O^{2-}$ as anions and is free of other anions.

The glass provided according to the present invention may comprise only small amounts of halides. In some embodiments, the content of halides among the anions is restricted to at most 20 anion-%, at most 10 anion-% or at most 5 anion-%, at most 3 anion-%, or at most 1 anion-%. Halides are understood according to the present invention as the anions of Cl, F and Br. In some embodiments, the glass is free of anions of Cl, F and/or Br or comprises these components in proportions of not more than 3 anion-%, 2 anion-% or 1 anion-% each. In some embodiments, the glass comprises Cl, for example in an amount of at least 0.1 anion-%, at least 0.2 anion-%, at least 0.5 anion-%, at least 1 anion-%, at least 2 anion-% or at least 3 anion-%, such as from 0.5 to 10 anion-% or from 1 to 5 anion-%.

When it is indicated in the present disclosure that the glass comprises cations of a certain component in an indicated amount in cat.-%, this refers to the total molar amount in cat.-% of all cation species of the respective component if not indicated otherwise. Thus, for example, a component M may be present in the glass in different oxidations states in the glass, for example as $M^{2+}$ and as $M^{3+}$. If it is indicated that the glass comprises cations of M in an amount or proportion of x cat.-%, this means that the sum of the amounts of $M^{2+}$ and $M^{3+}$ in the glass is equal to x cat.-%.

Terms like "proportion" or "amount" are used interchangeably within the present disclosure.

The glasses provided according to the present invention comprise cations of silicon (in particular $Si^{4+}$) in an amount of from 30 cat.-% to 80 cat.-%, such as from 35 cat.-% to 75 cat.-% or from 40 cat.-% to 70 cat.-%. Such amounts of cations of silicon may be advantageous for optimizing the desired chemical resistance and stability as well as the ability of the glass to be processed by hot forming. In some embodiments, the amount of cations of silicon in the glass is from 45 cat.-% to 70 cat.-%, such as from 50 cat.-% to 70 cat.-% or from 60 cat.-% to 70 cat.-%. The amount of cations of silicon may, for example, be at least 30 cat.-%, at least 35 cat.-%, at least 40 cat.-%, at least 45 cat.-%, at least 50 cat.-%, or at least 60 cat.-%. The amount of cations of silicon may, for example, be at most 80 cat.-%, at most 75 cat.-%, or at most 70 cat.-%.

The glasses provided according to the present invention comprise cations of alkali metals. This may be advantageous for meltability and for refining properties. Furthermore, it has been found that, in particular, a certain amount of cations of sodium and potassium is advantageous for increasing the solubility of coloring components such as cations of nickel and chromium in the glass. In this respect, it should be noted that black glasses are generally particularly difficult to melt so that the amount of cations of sodium and potassium has to be carefully chosen, also with respect to the amount of cations of nickel and chromium. In the glasses provided according to the present invention, the sum of the amounts of cations of sodium (in particular $Na^+$) and potassium (in particular $K^+$) is from 15 cat.-% to 50 cat.-%, such as from 20 cat.-% to 45 cat.-%, from 25 cat.-% to 40 cat.-%, from 25 cat.-% to 35 wt.-% or from 25 to 30 cat.-%. The sum of the amounts of cations of sodium and potassium may, for example, be at least 15 cat.-%, at least 20 cat.-%, or at least 25 cat.-%. The sum of the amounts of cations of sodium and potassium may, for example, be at most 50 cat.-%, at most 45 cat.-%, at most 40 cat.-%, at most 35 cat.-%, or at most 30 cat.-%.

Cations of sodium may be advantageous for increasing the solubility of coloring components such as cations of nickel and chromium in the glass. However, it turned out that the amount of cations of sodium should not be too high because otherwise the chemical resistance of the glasses may be reduced. The glasses provided according to the present invention comprise cations of sodium in an amount of from 5 to 35 cat.-%, such as from 7.5 to 30 cat.-%, from 10 to 25 cat.-%, from 12 to 20 cat.-%, or from 14 to 18 cat.-%. The amount of cations of sodium may, for example, be at least 5 cat.-%, at least 7.5 cat.-%, at least 10 cat.-%, at least 12 cat.-%, or at least 14 cat.-%. The amount of cations of sodium may, for example, be at most 35 cat.-%, at most 30 cat.-%, at most 25 cat.-%, at most 20 cat.-%, or at most 18 cat.-%.

Cations of potassium may be advantageous for increasing the chemical resistance. However, as compared to cations of sodium, the effect of cations of potassium on solubility of coloring components such as cations of nickel and chromium in the glass is not as high. Therefore, the amount of cations of potassium in the glass is in the range of from 2 to 25 cat.-%, such as from 5 to 20 cat.-%, from 6 to 15 cat.-%, or from 8 to 14 cat.-%. The amount of cations of potassium may, for example, be at least 2 cat.-%, at least 5 cat.-%, at least 6 cat.-%, or at least 8 cat.-%. The amount of cations of potassium may, for example, be at most 25 cat.-%, at most 20 cat.-%, at most 15 cat.-%, or at most 14 cat.-%.

In view of the different effects of cations of sodium and potassium in the glass as described previously, in some embodiments the molar proportion of potassium cations in the glass (in cat.-%) is smaller as compared to the molar proportion of sodium cations in the glass (in cat.-%). In some embodiments, the ratio of the molar proportion of potassium cations to the molar proportion of sodium cations in the glass is in a range of from 0.2:1 to <1:1, such as from 0.3:1 to 0.9:1, from 0.4:1 to 0.8:1, from 0.5:1 to 0.7:1, or from 0.6:1 to 0.7:1. The ratio of the molar proportion of potassium cations to the molar proportion of sodium cations may, for example, be at least 0.2:1, at least 0.3:1, at least 0.4:1, at least 0.5:1, or at least 0.6:1. The ratio of the molar proportion of potassium cations to the molar proportion of sodium cations may, for example, be lower than 1:1 such as at most 0.9:1, at most 0.8:1, or at most 0.7:1.

In addition to cations of sodium and potassium, the glasses provided according to the present invention may comprise cations of lithium (in particular $Li^+$), for example in an amount of from 0 to 4 cat.-% or from 0.1 to 2 cat.-% or from 0.5 to 1 cat.-%. The amount of cations of lithium may, for example, be at most 4 cat.-%, at most 2 cat.-%, or at most 1 cat.-%. The amount of cations of lithium may, for example, be at least 0.1 cat.-%, or at least 0.5 cat.-%. However, the glasses provided according to the present invention may be free of cations of lithium.

The glasses provided according to the present invention may comprise cations of boron (in particular $B^{3+}$). Cations of boron act as network modifiers and may compromise solubility of cations such as Cr(III). Cations of boron may be present in an amount of from 0 to 20 cat.-% such as from 1 to 15 cat.-% or from 5 to 10 cat.-%. The amount of cations of boron may, for example, be at least 1 cat.-%, or at least 5 cat.-%. The amount of cations of boron may, for example, be at most 20 cat.-%, at most 15 cat.-%, or at most 10 cat.-%. In some embodiments, the glass provided according to the present invention is free of cations of boron.

The glasses provided according to the present invention may comprise cations of aluminum (in particular $Al^{3+}$). Cations of aluminum act as network modifiers and may compromise solubility of cations such as Cr(III). Notably, the compromising effect of cations of aluminum is much stronger in this respect as compared to cations of boron. Moreover, raw materials containing cations of aluminum generally introduce water into the melt which is associated with generation of bubbles of water vapor at temperatures too low for being removed by refining. Therefore, the amount of cations of aluminum in the glasses provided according to the present invention is limited. Cations of aluminum may be present in an amount of from 0 to 2 cat.-% such as from 0.1 to 1.5 cat.-% or from 0.5 to 1 cat.-%. The amount of cations of aluminum may, for example, be at least 0.1 cat.-%, or at least 0.5 cat.-%. The amount of cations of aluminum may, for example, be at most 2 cat.-%, at most 1.5 cat.-%, or at most 1 cat.-%.

The glasses provided according to the present invention may comprise cations of barium (in particular $Ba^{2+}$), in an amount of from 0 to 10 cat.-%, for example from 0.1 to 5 cat.-% or from 0.5 to 2 cat.-%. The amount of cations of barium may, for example, be at least 0.1 cat.-%, or at least 0.5 cat.-%. The amount of cations of barium may, for example, be at most 10 cat.-%, at most 5 cat.-%, or at most 2 cat.-%. In some embodiments, the glass provided according to the present invention is free of cations of barium.

The glasses provided according to the present invention may comprise cations of magnesium (in particular $Mg^{2+}$). The amount of cations of magnesium in the glasses provided according to the present invention may be from 0 to 2.5 cat.-%, for example from 0.1 to 2 cat.-% or from 0.5 to 1.5 cat.-%. The amount of cations of magnesium may, for example, be at least 0.1 cat.-%, or at least 0.5 cat.-%. The amount of cations of magnesium may, for example, be at most 2.5 cat.-%, at most 2 cat.-%, or at most 1.5 cat.-%. In some embodiments, the glass provided according to the present invention is free of cations of magnesium.

The glasses provided according to the present invention may comprise cations of zinc in amounts of from 0 to 15 cat.-%. High amounts of zinc may compromise the chemical resistance. However, zinc is very advantageous for meltability of the glass. In some embodiments, the glass comprises cations of zinc in an amount of from 1 to 12 cat.-%, such as from 2 to 10 cat.-% or from 4 to 8 cat.-%. The amount of cations of zinc may, for example, be at least 1 cat.-%, at least 2 cat.-%, or at least 4 cat.-%. The amount of cations of zinc may, for example, be at most 15 cat.-%, at most 12 cat.-%, at most 10 cat.-%, or at most 8 cat.-%.

The glasses provided according to the present invention may comprise cations of lanthanum in an amount of from 0 to 10 cat.-%. In some embodiments, the amount of cations of lanthanum in the glasses provided according to the present invention is from 0 to 8 cat.-%, for example from 0.1 to 6 cat.-% or from 0.2 to 4 cat.-%. The amount of cations of lanthanum may, for example, be at least 0.1 cat.-%, or at least 0.2 cat.-%. The amount of cations of lanthanum may, for example, be at most 10 cat.-%, at most 8 cat.-%, at most 6 cat.-%, or at most 4 cat.-%. In some embodiments provided according to the present invention, the glass is free of cations of lanthanum.

The glasses provided according to the present invention may comprise cations of antimony. In some embodiments, the amount of cations of antimony in the glasses provided according to the present invention is from 0 to 0.4 cat.-%, for example from 0.1 to 0.3 cat.-%. The amount of cations of antimony may, for example, be at least 0.1 cat.-%. The amount of cations of antimony may, for example, be at most 0.4 cat.-%, or at most 0.3 cat.-%. In some embodiments, the glasses provided according to the present invention are free of cations of antimony.

The glasses provided according to the present invention may comprise cations of arsenic, for example in an amount of from 0 to 0.2 cat.-% or from 0.1 to 0.15 cat.-%. The amount of cations of arsenic may, for example, be at least 0.1 cat.-%. The amount of cations of arsenic may, for example, be at most 0.2 cat.-%, or at most 0.15 cat.-%. In some embodiments, the glasses provided according to the present invention are free of cations of arsenic.

Cations of cerium and titanium are components that are particularly advantageous for blocking UV radiation. However, it was surprisingly found that glasses having advantageous optical properties can also be obtained without any cations of cerium and titanium. Therefore, cations of cerium and titanium are optional components. Thus, the glasses may, for example, be free of cations of cerium, or free of cations of titanium, or free of cations of both cerium and titanium.

The amount of cations of titanium in the glasses provided according to the present invention may be in the range of from 0 to 10 cat.-%, for example from 0.5 to 8 cat.-% or from 1 to 5 cat.-%. The amount of cations of titanium may, for example, be at least 0.5 cat.-%, or at least 1 cat.-%. The amount of cations of titanium may, for example, be at most 10 cat.-%, at most 8 cat.-%, at most 5 cat.-%, at most 4 cat.-%, at most 3 cat.-%, at most 2 cat.-%, or at most 1.5 cat.-%.

The amount of cations of cerium in the glasses provided according to the present invention may be in the range of from 0 to 5 cat.-%, for example from 0.1 to 4 cat.-% or from 0.3 to 3 cat.-%. The amount of cations of cerium may, for example, be at least 0.1 cat.-%, or at least 0.3 cat.-%. The amount of cations of cerium may, for example, be at most 5 cat.-%, at most 4 cat.-%, at most 3 cat.-%, at most 2 cat.-%, at most 1.5 cat.-%, at most 1 cat.-%, or at most 0.5 cat.-%.

As described previously, the glasses provided according to the present invention are very advantageous for applications requiring low transmission in the visible range and high transmission in the NIR range, such as optical windows for LiDAR. Furthermore, the glasses provided according to the present invention have a particularly neutrally black color impression. In order to achieve such advantageous spectral properties, the glasses provided according to the present invention comprise components that may be termed absorbing components or coloring components, although the term "coloring" may be misleading in this respect because the overall color impression achieved by specific combinations of such components is neutrally black.

One absorbing component that is necessarily present in the glasses provided according to the present invention is cations of cobalt. Cations of cobalt are needed in order to achieve the advantageous spectral properties. However, the amount of cations of cobalt has to be chosen very carefully in order not to compromise the spectral properties. In the glasses provided according to the present invention, the amount of cations of cobalt is from 0.03 cat.-% to 0.5 cat.-%, such as from 0.04 to 0.4 cat.-%, from 0.05 to 0.3 cat.-%, from 0.06 to 0.2 cat.-%, or from 0.07 to 0.16 cat.-%. The amount of cations of cobalt may, for example, be at least 0.03 cat.-%, at least 0.04 cat.-%, at least 0.05 cat.-%, at least 0.06 cat.-%, or at least 0.07 cat.-%. The amount of cations of cobalt may, for example, be at most 0.5 cat.-%, at most 0.4 cat.-%, at most 0.3 cat.-%, at most 0.2 cat.-%, or at most 0.16 cat.-%.

However, cations of cobalt are not enough for achieving the advantageous spectral properties. Rather, it was found that cations of at least one of nickel and chromium have to be present in addition. Moreover, the amount of cations of nickel and chromium has to be chosen very carefully. In particular, the sum of the molar proportions of cations of nickel and chromium is in a range of from 0.1 to 0.5 cat.-%, such as from 0.12 to 0.45 cat.-%, from 0.15 to 0.4 cat.-%, from 0.16 to 0.35 cat.-%, or from 0.18 to 0.3 cat.-%. The sum of the molar proportions of cations of nickel and chromium may, for example, be at least 0.1 cat.-%, at least 0.12 cat.-%, at least 0.15 cat.-%, at least 0.16 cat.-%, or at least 0.18 cat.-%. The sum of the molar proportions of cations of nickel and chromium may, for example, be at most 0.5 cat.-%, at most 0.45 cat.-%, at most 0.4 cat.-%, at most 0.35 cat.-%, or at most 0.3 cat.-%.

The amount of the sum of cations of nickel and chromium in the glass turned out to be important. However, the glasses provided according to the present invention do not necessarily comprise cations of both nickel and chromium. Rather, it is sufficient if cations of one of nickel and chromium are present. In some embodiments, cations of both nickel and chromium may be present. In such embodiments, the molar proportion of cations of nickel may be higher as compared to the molar proportion of cations of chromium. In some embodiments, the glasses provided according to the present invention comprise either cations of nickel or cations of chromium. For example, in some embodiments the glass may be free of cations of nickel.

The amount of cations of nickel in the glasses provided according to the present invention is from 0 to 0.5 cat.-%, for example from 0.1 to 0.4 cat.-% or from 0.2 to 0.35 cat.-%. The amount of cations of nickel may, for example, be at least 0.1 cat.-%, or at least 0.2 cat.-%. The amount of cations of nickel may, for example, be at most 0.5 cat.-%, at most 0.4 cat.-%, or at most 0.35 cat.-%.

The amount of cations of chromium in the glasses provided according to the present invention is from 0 to 0.5 cat.-%, for example from 0.05 to 0.4 cat.-%, from 0.1 to 0.3 cat.-%, from 0.15 to 0.3 cat.-% or from 0.15 to 0.25 cat.-%. The amount of cations of chromium may, for example, be at least 0.05 cat.-%, at least 0.1 cat.-%, or at least 0.15 cat.-%. The amount of cations of chromium may, for example, be at most 0.5 cat.-%, at most 0.4 cat.-%, at most 0.3 cat.-%, or at most 0.25 cat.-%.

In some embodiments, among the cations of chromium in the glass the amount of chromium(VI) or $Cr^{6+}$ is extremely low, for example such that the molar ratio of the amount chromium(VI) to the total amount of chromium cations in the glass is less than 0.05:1 or less than 0.01:1 or even less than 0.001:1. The reason is that chromium(VI) is highly toxic and should be avoided. In order to achieve this, chromium(VI) based raw materials such as $CrO_3$ may be avoided during production of the glass. Raw materials such as potassium dichromate or sodium dichromate should also be avoided for this reason. Previously, such materials have been frequently used because they provide particularly good solubility and meltability properties. Furthermore, the glass should not be produced under oxidizing conditions. Therefore, oxygen bubbling may be avoided. Moreover, $NO_3$ may be avoided as well.

However, a drawback of producing the glass under reducing conditions is that the melting process is particularly difficult. Black glasses are generally very difficult to melt. Reducing conditions further deteriorate the meltability. In particular, components such as cations of nickel and chromium are problematic in this respect. Moreover, cations of chromium other than chromium(VI), such as for example chromium(III), are particularly difficult in this respect. Therefore, it is highly complicated to produce such glasses. However, it was now found that glasses can be produced particularly well, even under reducing conditions, if there is a large excess of cations of sodium of potassium over cations of nickel and chromium. In the glasses provided according to the present invention, the ratio of the sum of the molar proportions of cations of sodium and potassium to the sum of the molar proportions of cations of nickel and chromium is in a range of from 70:1 to 200:1, such as from 75:1 to 180:1, from 80:1 to 160:1, from 90:1 to 150:1, from 100:1 to 145:1, from 100:1 to 140:1, or from 110:1 to 140:1. The ratio of the sum of the molar proportions of cations of sodium and potassium to the sum of the molar proportions of cations of nickel and chromium may, for example, be at least 70:1, at least 75:1, at least 80:1, at least 90:1, at least 100:1, or at least 110:1. The ratio of the sum of the molar proportions of cations of sodium and potassium to the sum of the molar proportions of cations of nickel and chromium may, for example, be at most 200:1, at most 180:1, at most 160:1, at most 150:1, at most 145:1, or at most 140:1.

Surprisingly it was found that it is advantageous for even further improving the spectral properties of the glass if cations of nickel and chromium are present in certain molar ratio as compared to the amount of cations of cobalt. In particular, the sum of the molar proportions of cations of nickel and chromium may be higher than the molar proportion of cations of cobalt. However, the excess of cations of nickel and chromium is may be not chosen to be very high. Rather, it was found that desired spectral properties can be achieved within a certain range. In some embodiments, the ratio of the sum of the molar proportions of cations of nickel and chromium to the molar proportion of cations of cobalt is in a range of from >1:1 to 5:1, such as from 1.2:1 to 4:1, from 1.5:1 to 3.5:1, from 1.75:1 to 3.25:1, from 2:1 to 3:1, from 2.2:1 to 3:1, or from 2.2:1 to 2.65:1. The ratio of the sum of the molar proportions of cations of nickel and chromium to the molar proportion of cations of cobalt may, for example, be higher than 1:1 such as at least 1.2:1, at least 1.5:1, at least 1.75:1, at least 2:1, or at least 2.2:1. The ratio of the sum of the molar proportions of cations of nickel and chromium to the molar proportion of cations of cobalt may, for example, be at most 5:1, at most 4:1, at most 3.5:1, at most 3.25:1, at most 3:1, or at most 2.65:1.

The glasses provided according to the present invention may comprise other coloring components for fine tuning the spectral properties. However, this is not necessary. It is sufficient if cations of cobalt and cations of one of nickel and chromium are present. In some embodiments, the glasses provided according to the present invention additionally comprise cations of manganese in an amount of from 0 to 0.5 cat.-%, for example from 0.1 to 0.4 cat.-% or from 0.15 to 0.35 cat.-%. The amount of cations manganese may, for example, be at most 0.5 cat.-%, at most 0.4 cat.-%, or at most 0.35 cat.-%. The glasses provided according to the present invention may be free of cations of manganese. However, in some embodiments the amount of cations of manganese may, for example, be at least 0.1 cat.-%, or at least 0.15 cat.-%. However, the amount of cations of manganese may be smaller as compared to the sum of the amounts of cations of nickel and chromium. In some embodiments, the ratio of the molar proportion of cations of manganese to the sum of the molar proportions of cations of nickel and chromium is in a range of from 0:1 to <1:1, for example from 0:1 to 0.95:1, from 0.5:1 to 0.9:1 or from 0.6:1 to 0.9:1. The ratio of the molar proportion of cations of manganese to the sum of the molar proportions of cations of nickel and chromium may, for example, be at least 0.5:1, at least 0.6:1, or at least 0.9:1. The ratio of the molar proportion of cations of manganese to the sum of the molar proportions of cations of nickel and chromium may, for example, be lower than 1:1 such as at most 0.95:1, or at most 0.9:1.

In some embodiments, the amount of cations of lead in the glasses provided according to the present invention is from 0 to 1 cat.-%, such as less than 0.5 cat.-% or less than 0.1 cat.-%. In some embodiments, the glasses provided according to the present invention are free of cations of lead.

In some embodiments, the amount of cations of zirconium in the glasses provided according to the present invention is from 0 to 1 cat.-%, such as less than 0.5 cat.-% or less than 0.1 cat.-%. In some embodiments, the glasses provided according to the present invention are free of cations of zirconium.

In some embodiments, the amount of cations of strontium in the glasses provided according to the present invention is from 0 to 1 cat.-%, such as less than 0.5 cat.-% or less than 0.1 cat.-%. In some embodiments, the glasses provided according to the present invention are free of cations of strontium.

In some embodiments, the amount of cations of calcium in the glasses provided according to the present invention is from 0 to 1 cat.-%, such as less than 0.5 cat.-% or less than 0.1 cat.-%. In some embodiments, the glasses provided according to the present invention are free of cations of calcium.

In some embodiments, the amount of cations of iron in the glasses provided according to the present invention is from 0 to 1 cat.-%, such as less than 0.5 cat.-% or less than 0.1 cat.-%. In some embodiments, the glasses provided according to the present invention are free of cations of iron.

When in this description it is mentioned that the glasses are free of cations of a component or that they do not contain cations of a certain component, then this means that cations of this component are only allowed to be present as an impurity in the glasses. This means that it is not added in substantial amounts. Not substantial amounts are amounts of less than 300 ppm (based molar proportion of cations), such as less than 200 ppm (based molar proportion of cations), less than 100 ppm (based molar proportion of cations), less than 50 ppm (based molar proportion of cations), or less than 10 ppm (based molar proportion of cations).

In some embodiments, cations of silicon, sodium, potassium and cobalt and one or more of cations of nickel and chromium and one or more of cations of aluminum, boron, barium, zinc, lanthanum, titanium, cerium and manganese represent at least 90 cat.-%, such as at least 95 cat.-%, at least 98 cat.-%, to at least 99 cat.-%, to at least 99.5 cat.-%, or at least 99.9 cat.-% of the total amount of cations in the glass.

The glass provided according to the present invention may be used as an optical window for LiDAR systems. Such optical windows provide protection against environmental impacts for the opto-electronic components of the system. Depending on the type of LiDAR system, such optical windows may be planar or curved. Commonly used are also spinning LiDAR systems in which emitter and detector rotate within a typically stationary ring window.

LiDAR systems generally work by emitting laser light in the NIR spectrum, in particular having wavelengths of more than 780 nm. Therefore, it is important for such applications that the glass has a high transmission in the NIR range in order for the laser light to pass. On the other hand, the glass should have a low transmission for visible light in order to prevent visibility of structures positioned behind the glass.

There have been attempts to achieve such optical properties by a coating that blocks transmission of visible light. However, coatings are a safety risk, in particular in the automotive sector. Furthermore, coating of round-shaped glass sheets is complicated and associated with high costs due to the angular dependence of blocking of light. Many coatings are also less effective. Therefore, it would be advantageous to achieve the desired properties of low transmission in the visible range and high transmission in the NIR range with the glass itself, i.e. without the need for any light blocking coatings.

Furthermore, a neutrally black color impression is often desired but not achieved sufficiently by the prior art. In particular, it has been desired to achieve a neutrally black color impression at a comparably low glass thickness in order to lower the weight of the glass products.

A further lowering of weight can also be achieved by using low density glasses. In some embodiments, the glasses provided according to the present invention have a low density.

The refractive index $n_d$ of the glasses provided according to the present invention may be in a range of from 1.50 to 1.55, for example from 1.50 to 1.53 or from 1.51 to 1.52. The refractive index $n_d$ may be determined using reference glasses without coloring components.

The glasses provided according to the present invention are highly advantageous in several aspects. They have advantageous spectral properties such as low transmission in the visible range, high transmission in the NIR range and a neutrally black color impression. Furthermore, they have a very good chemical resistance and climate resistance which makes them particularly useful for outdoor applications. Moreover, the glasses have a good meltability and they can be processed well by hot forming processes. The latter is due to the long viscosity profile of the glasses. This means that the viscosity does not vary so much with differing temperature. Glasses having a long viscosity profile are advantageous for hot forming because these glasses have a greater temperature range at which they can be processed. Thus, the process does not have to be aimed at the fastest possible processing of the still hot glass.

The terms "transmission" and "transmittance" are used interchangeably within the present disclosure. When the terms "transmission" or "transmittance" are mentioned in the present disclosure, this refers to the total transmission or total transmittance if not indicated otherwise, i.e. the transmission as measured taking into account both absorptive losses and reflective losses. If, on the other hand the internal transmittance is addressed, this is clearly indicated herein by referring to the "internal transmittance" or "internal transmission". The internal transmission is determined as the ratio of the total transmission and the $P_d$ value. The $P_d$ value represents a measure of reflective losses and can easily be calculated based on the refractive index $n_d$ using the following formula.

$$P_d = \frac{2 \cdot n_d}{n_d^2 + 1}$$

For example, for a glass having a refractive index $n_d$ of 1.515, the Pa value is about 0.92. This means that an internal transmission of 100% would result in a total transmission of about 92%. Notably, reflective losses may be reduced using anti-reflective coatings (AR coatings) so that the total transmission may be increased beyond 92%. However, within the present disclosure the terms "transmission" or "transmittance" refer to the total transmission of glass samples without any AR coatings.

In some embodiments, the glasses provided according to the present invention have $P_d$ value in the range of from 0.911 to 0.925, such as from 0.915 to 0.924 or from 0.920 to 0.923.

As described previously, the glass provided according to the present invention has a low transmission in the visible range.

In some embodiments, the glass provided according to the present invention at a thickness of 2 mm has an average transmission for light of a wavelength in the range of from 250 nm to 700 nm of at most 15%, such as at most 12%, at most 10%, at most 7.5%, at most 6%, at most 5%, at most 4%, at most 3%, at most 2%, or at most 1%. In order to determine this average transmission, the transmission is measured for any wavelength starting from 250 nm in increments of 1 nm until 700 nm. Thus, transmission is measured at 250 nm, 251 nm, 252 nm, . . . , 698 nm, 699 nm and 700 nm. In total, the transmission is determined at 451 different wavelengths from 250 nm to 700 nm. The average transmission in the range of from 250 nm to 700 nm is then determined as the mean value of the 451 transmission values that have been measured. The glass provided according to the present invention at a thickness of 2 mm may, for example, have an average transmission for light of a wavelength in the range of from 250 nm to 700 nm of at least 0.1%, at least 0.2%, at least 0.5% or at least 0.75%.

In some embodiments, the average transmission in smaller wavelength regions within the range of from 250 nm to 700 nm is low. For example, at a sample thickness of 2 mm, the average transmission in any subrange of 20 nm width within the range of from 250 nm to 700 nm may be at most 35%, such as at most 30%, at most 25%, at most 20%, or at most 15%. This means that the average transmission may be at most 35%, at most 30%, at most 25%, at most 20%, or at most 15% in the subrange of from 250 nm to 270 nm, in the subrange of from 251 nm to 271 nm, in the subrange of from 252 nm to 272 nm, . . . , in the subrange of from 678 nm to 698 nm, in the subrange of from 679 nm to 699 nm and in the subrange of from 680 nm to 700 nm. In order to determine this average transmission, the transmission is measured for any wavelength starting from 250 nm in increments of 1 nm until 700 nm. Thus, transmission is measured at 250 nm, 251 nm, 252 nm, . . . , 698 nm, 699 nm and 700 nm. In total, the transmission is determined at 451 different wavelengths from 250 nm to 700 nm. The average transmission is then determined for each of the 431 subranges indicated above as the mean value of the 21 transmission values in each of the subranges. At a sample thickness of 2 mm, the average transmission in any subrange of 20 nm width within the range of from 250 nm to 700 nm may, for example, be at least 1%, at least 2% or at least 5%.

In some embodiments, the maximum transmission in the wavelength range of from 250 nm to 700 nm is comparably low. In some embodiments, the glass provided according to the present invention at a thickness of 2 mm has a maximum transmission for light of a wavelength in the range of from 250 nm to 700 nm of at most 45%, such as at most 40%, at most 35%, at most 30%, at most 25%, at most 20%, or at most 15%. In order to determine the maximum transmission, the transmission is measured for any wavelength starting from 250 nm in increments of 1 nm until 700 nm. Thus, transmission is measured at 250 nm, 251 nm, 252 nm, . . . , 698 nm, 699 nm and 700 nm. In total, the transmission is determined at 451 different wavelengths from 250 nm to 700 nm. The maximum transmission in the range of from 250 nm to 700 nm is then determined as the maximum value of the 451 transmission values that have been measured. The glass provided according to the present invention at a thickness of 2 mm may, for example, have a maximum transmission for light of a wavelength in the range of from 250 nm to 700 nm of at least 1%, at least 2%, at least 5%, or even at least 10%.

The glasses provided according to the present invention do not only have a low transmission in the visible wavelength range but also a high transmission in the NIR wavelength range. Particularly relevant is the transmission in a range of from 850 nm to 950 nm.

In some embodiments, the glass provided according to the present invention at a thickness of 2 mm has an average transmission for light of a wavelength in the range of from 850 nm to 950 nm of at least 40%, such as at least 45%, at least 50%, at least 60%, at least 70%, at least 80%, at least 85%, or at least 90%. In order to determine this average transmission, the transmission is measured for any wavelength starting from 850 nm in increments of 1 nm until 950 nm. Thus, transmission is measured at 850 nm, 851 nm, 852 nm, . . . , 948 nm, 949 nm and 950 nm. In total, the transmission is determined at 101 different wavelengths from 850 nm to 950 nm. The average transmission in the range of from 850 nm to 950 nm is then determined as the mean value of the 101 transmission values that have been measured. The glass provided according to the present invention at a thickness of 2 mm may, for example, have an average transmission for light of a wavelength in the range of from 850 nm to 950 nm of at most 92%, at most 91.5%, at most 91.25% or at most 91.2%.

In some embodiments, the average transmission in smaller wavelength regions within the range of from 850 nm to 950 nm is high. For example, at a sample thickness of 2 mm the average transmission in any subrange of 20 nm width within the range of from 850 nm to 950 nm may be at least 40%, such as at least 45%, at least 50%, at least 60%, at least 70%, at least 80%, at least 85%, or at least 90%. This means that the average transmission may be at least 40%, such as at least 45%, at least 50%, at least 60%, at least 70%, at least 80%, at least 85%, or at least 90% in the subrange of from 850 nm to 870 nm, in the subrange of from 851 nm to 871 nm, in the subrange of from 852 nm to 872 nm, . . . , in the subrange of from 928 nm to 948 nm, in the subrange of from 929 nm to 949 nm and in the subrange of from 930 nm to 950 nm. In order to determine this average transmission, the transmission is measured for any wavelength starting from 850 nm in increments of 1 nm until 950 nm. Thus, transmission is measured at 850 nm, 851 nm, 852 nm, . . . , 948 nm, 949 nm and 950 nm. In total, the transmission is determined at 101 different wavelengths from 850 nm to 950 nm. The average transmission is then determined for each of the 81 subranges indicated above as the mean value of the 21 transmission values in each of the subranges. At a sample thickness of 2 mm the average transmission in any subrange of 20 nm width within the range of from 850 nm to 950 nm may, for example, be at most 92%, at most 91.5%, at most 91.1% or at most 91%.

In some embodiments, the minimum transmission in the wavelength range of from 850 nm to 950 nm is comparably high. In some embodiments, the glass provided according to the present invention at a thickness of 2 mm has a minimum transmission for light of a wavelength in the range of from 850 nm to 950 nm of at least 35%, such as at least 40%, at least 45%, at least 50%, at least 60%, at least 70%, at least 80%, at least 85%, or at least 90%. In order to determine the minimum transmission, the transmission is measured for any wavelength starting from 850 nm in increments of 1 nm until 950 nm. Thus, transmission is measured at 850 nm, 851 nm, 852 nm, . . . , 948 nm, 949 nm and 950 nm. In total, the transmission is determined at 101 different wavelengths from 850 nm to 950 nm. The minimum transmission in the range of from 850 nm to 950 nm is then determined as the minimum value of the 101 transmission values that have been measured. The glass provided according to the present invention at a thickness of 2 mm may, for example, have a minimum transmission for light of a wavelength in the range of from 800 nm to 900 nm of at most 92%, at most 91%, at most 90.9% or at most 90.8%.

As described previously, the glass provided according to the present invention has a low transmission in the visible range.

In some embodiments, the glass provided according to the present invention at a thickness of 4 mm has an average transmission for light of a wavelength in the range of from 250 nm to 700 nm of at most 4%, such as at most 3.5%, at most 3%, at most 2.5%, at most 2%, at most 1.5%, at most 1.25%, at most 1%, at most 0.75%, or at most 0.5%. In order to determine this average transmission, the transmission is measured for any wavelength starting from 250 nm in increments of 1 nm until 700 nm. Thus, transmission is measured at 250 nm, 251 nm, 252 nm, . . . , 698 nm, 699 nm and 700 nm. In total, the transmission is determined at 451 different wavelengths from 250 nm to 700 nm. The average transmission in the range of from 250 nm to 700 nm is then determined as the mean value of the 451 transmission values that have been measured. The glass provided according to the present invention at a thickness of 4 mm may, for example, have an average transmission for light of a wavelength in the range of from 250 nm to 700 nm of at least 0.01%, at least 0.02%, at least 0.05% or at least 0.1%.

In some embodiments, the average transmission in smaller wavelength regions within the range of from 250 nm to 700 nm is low. For example, at a sample thickness of 4 mm the average transmission in any subrange of 20 nm width within the range of from 250 nm to 700 nm may be at most 14%, such as at most 13%, at most 12%, at most 10%, at most 8% at most 6%, or at most 5%. This means that the average transmission may be at most 14%, at most 13%, at most 12%, at most 10%, at most 8% at most 6%, or at most 5% in the subrange of from 250 nm to 270 nm, in the subrange of from 251 nm to 271 nm, in the subrange of from 252 nm to 272 nm, . . . , in the subrange of from 678 nm to 698 nm, in the subrange of from 679 nm to 699 nm and in the subrange of from 680 nm to 700 nm. In order to determine this average transmission, the transmission is measured for any wavelength starting from 250 nm in increments of 1 nm until 700 nm. Thus, transmission is measured at 250 nm, 251 nm, 252 nm, . . . , 698 nm, 699 nm and 700 nm. In total, the transmission is determined at 451 different wavelengths from 250 nm to 700 nm. The average transmission is then determined for each of the 431 subranges indicated above as the mean value of the 21 transmission values in each of the subranges. At a sample thickness of 4 mm the average transmission in any subrange of 20 nm width within the range of from 250 nm to 700 nm may, for example, be at least 0.1%, at least 0.2% or at least 1%.

In some embodiments, the maximum transmission in the wavelength range of from 250 nm to 700 nm is comparably low. In some embodiments, the glass provided according to the present invention at a thickness of 4 mm has a maximum transmission for light of a wavelength in the range of from 250 nm to 700 nm of at most 23%, such as at most 22%, at most 20%, at most 15%, at most 14%, at most 13%, or at most 10%. In order to determine the maximum transmission, the transmission is measured for any wavelength starting from 250 nm in increments of 1 nm until 700 nm. Thus, transmission is measured at 250 nm, 251 nm, 252 nm, . . . , 698 nm, 699 nm and 700 nm. In total, the transmission is determined at 451 different wavelengths from 250 nm to 700 nm. The maximum transmission in the range of from 250 nm to 700 nm is then determined as the maximum value of the 451 transmission values that have been measured. The glass provided according to the present invention at a thickness of 4 mm may, for example, have a maximum transmission for light of a wavelength in the range of from 250 nm to 700 nm of at least 0.5%, at least 1%, at least 2%, or even at least 4%.

The glasses provided according to the present invention do not only have a low transmission in the visible wavelength range but also a high transmission in the NIR wavelength range. Particularly relevant is the transmission in a range of from 850 nm to 950 nm.

In some embodiments, the glass provided according to the present invention at a thickness of 4 mm has an average transmission for light of a wavelength in the range of from 850 nm to 950 nm of at least 20%, such as at least 25%, at least 30%, at least 35%, at least 40%, at least 50%, at least 60%, at least 70%, at least 80%, at least 85%, or at least 90%. In order to determine this average transmission, the transmission is measured for any wavelength starting from 850 nm in increments of 1 nm until 950 nm. Thus, transmission is measured at 850 nm, 851 nm, 852 nm, . . . , 948 nm, 949 nm and 950 nm. In total, the transmission is determined at 101 different wavelengths from 850 nm to 950 nm. The average transmission in the range of from 850 nm to 950 nm is then determined as the mean value of the 101 transmission values that have been measured. The glass provided according to the present invention at a thickness of 4 mm may, for example, have an average transmission for light of a wavelength in the range of from 850 nm to 950 nm of at most 92%, at most 91%, at most 90.5% or at most 90.4%.

In some embodiments, the average transmission in smaller wavelength regions within the range of from 850 nm to 950 nm is high. For example, at a sample thickness of 4 mm the average transmission in any subrange of 20 nm width within the range of from 850 nm to 950 nm may be at least 20%, such as at least 25%, at least 30%, at least 35%, at least 40%, at least 50%, at least 60%, at least 70%, at least 80%, at least 85%, or at least 90%. This means that the average transmission may be at least 20%, such as at least 25%, at least 30%, at least 35%, at least 40%, at least 50%, at least 60%, at least 70%, at least 80%, at least 85%, or at least 90% in the subrange of from 850 nm to 870 nm, in the subrange of from 851 nm to 871 nm, in the subrange of from 852 nm to 872 nm, . . . , in the subrange of from 928 nm to 948 nm, in the subrange of from 929 nm to 949 nm and in the subrange of from 930 nm to 950 nm. In order to determine this average transmission, the transmission is measured for any wavelength starting from 850 nm in increments of 1 nm until 950 nm. Thus, transmission is measured at 850 nm, 851 nm, 852 nm, . . . , 948 nm, 949 nm and 950 nm. In total, the transmission is determined at 101 different wavelengths from 850 nm to 950 nm. The average transmission is then determined for each of the 81 subranges indicated above as the mean value of the 21 transmission values in each of the subranges. At a sample thickness of 4 mm the average transmission in any subrange of 20 nm width within the range of from 850 nm to 950 nm may, for example, be at most 92%, at most 91%, at most 90% or at most 89.9%.

In some embodiments, the minimum transmission in the wavelength range of from 850 nm to 950 nm is comparably high. In some embodiments, the glass provided according to the present invention at a thickness of 4 mm has a minimum transmission for light of a wavelength in the range of from 850 nm to 950 nm of at least 15%, such as at least 20%, at least 25%, at least 30%, at least 35%, at least 40%, at least 50%, at least 60%, at least 70%, at least 80%, at least 85%, or at least 90%. In order to determine the minimum transmission, the transmission is measured for any wavelength starting from 850 nm in increments of 1 nm until 950 nm. Thus, transmission is measured at 850 nm, 851 nm, 852 nm, . . . , 948 nm, 949 nm and 950 nm. In total, the transmission is determined at 101 different wavelengths from 850 nm to 950 nm. The minimum transmission in the range of from 850 nm to 950 nm is then determined as the minimum value of the 101 transmission values that have been measured. The glass provided according to the present invention at a thickness of 4 mm may, for example, have a minimum transmission for light of a wavelength in the range of from 800 nm to 900 nm of at most 92%, at most 91%, at most 90% or at most 89.7%.

As described previously, the glasses provided according to the present invention have a high transmission in the NIR range and a low transmission in the visible range.

In some embodiments, at a sample thickness of 2 mm the ratio of the average transmission for light of a wavelength in the range of from 850 nm to 950 nm and the average transmission for light of a wavelength in the range of from 250 nm to 700 nm is in the range of from 6:1 to 200:1, such as from 7:1 to 150:1, from 8:1 to 100:1, from 10:1 to 80:1, from 12:1 to 60:1, from 15:1 to 50:1, from 18:1 to 40:1, or from 20:1 to 30:1.

In some embodiments, at a sample thickness of 2 mm the ratio of the lowest average transmission of all subranges of 20 nm width within the range of from 850 nm to 950 nm and the highest average transmission of all subranges of 20 nm width within the range of from 250 nm to 700 nm is in the range of from 2.5:1 to 20:1, such as from 2.6:1 to 15:1, from 2.7:1 to 10:1, from 2.8:1 to 9:1, from 2.9:1 to 8:1, from 3.0:1 to 7:1, from 3.1:1 to 6:1, from 3.2:1 to 5:1, from 3.3:1 to 4:1, or from 3.4:1 to 3.5:1.

In some embodiments, at a sample thickness of 2 mm the ratio of the minimum transmission for light of a wavelength in the range of from 850 nm to 950 nm and the maximum transmission for light of a wavelength in the range of from 250 nm to 700 nm is in the range of from 1.9:1 to 15:1, such as from 2.0:1 to 10:1, from 2.1:1 to 9:1, from 2.2:1 to 8:1, from 2.3:1 to 7:1, from 2.4:1 to 6:1, from 2.5:1 to 5:1, from 2.6:1 to 4:1, from 2.7:1 to 3.5:1, or from 2.8:1 to 3:1.

In some embodiments, at a sample thickness of 4 mm the ratio of the average transmission for light of a wavelength in the range of from 850 nm to 950 nm and the average transmission for light of a wavelength in the range of from 250 nm to 700 nm is in the range of from 20:1 to 400:1, such as from 25:1 to 300:1, from 30:1 to 250:1, from 40:1 to 200:1, from 50:1 to 150:1, from 60:1 to 140:1, from 70:1 to 130:1, or from 80:1 to 120:1.

In some embodiments, at a sample thickness of 4 mm the ratio of the lowest average transmission of all subranges of 20 nm width within the range of from 850 nm to 950 nm and the highest average transmission of all subranges of 20 nm width within the range of from 250 nm to 700 nm is in the range of from 6:1 to 50:1, such as from 6.5:1 to 40:1, from 7:1 to 30:1, from 7.5:1 to 25:1, from 8:1 to 20:1, from 8.5:1 to 18:1, from 9:1 to 15:1, from 9.5:1 to 14:1, from 10:1 to 13:1, or from 10.5:1 to 12:1.

In some embodiments, at a sample thickness of 4 mm the ratio of the minimum transmission for light of a wavelength in the range of from 850 nm to 950 nm and the maximum transmission for light of a wavelength in the range of from 250 nm to 700 nm is in the range of from 3.5:1 to 15:1, such as from 3.75:1 to 12:1, from 4.0:1 to 10:1, from 4.25:1 to 9:1, from 4.5:1 to 8:1, from 4.75:1 to 7.5:1, from 5.0:1 to 7:1, from 5.25:1 to 6.75:1, from 5.5:1 to 6.5:1, or from 5.75:1 to 6.25:1.

In some embodiments, the glasses provided according to the present invention have an internal transmittance at a wavelength of 905 nm of more than 95%, such as more than 96%, more than 97%, or more than 98% at a sample thickness of 2 mm or at a sample thickness of 4 mm.

As described previously, the glass provided according to the present invention has a low internal transmission in the visible range.

In some embodiments, the glass provided according to the present invention at a thickness of 2 mm has an average internal transmission for light of a wavelength in the range of from 250 nm to 700 nm of at most 15%, such as at most 12%, at most 11%, at most 10%, at most 7.5%, at most 6%, at most 5%, at most 4%, at most 3%, at most 2%, or at most 1%. In order to determine this average internal transmission, the transmission is measured for any wavelength starting from 250 nm in increments of 1 nm until 700 nm. Thus, transmission is measured at 250 nm, 251 nm, 252 nm, . . . , 698 nm, 699 nm and 700 nm. In total, the transmission is determined at 451 different wavelengths from 250 nm to 700 nm. The internal transmission is determined as a ratio of the transmission as measured and the Pa value as described previously. The average internal transmission in the range of from 250 nm to 700 nm is then determined as the mean value of the 451 internal transmission values that have been determined. The glass provided according to the present invention at a thickness of 2 mm may, for example, have an average internal transmission for light of a wavelength in the range of from 250 nm to 700 nm of at least 0.1%, at least 0.2%, at least 0.5% or at least 0.75%.

In some embodiments, the average internal transmission in smaller wavelength regions within the range of from 250 nm to 700 nm is low. For example, at a sample thickness of 2 mm the average internal transmission in any subrange of 20 nm width within the range of from 250 nm to 700 nm may be at most 39%, such as at most 35%, at most 30%, at most 25%, at most 20%, or at most 15%. This means that the average internal transmission may be at most 39%, at most 35%, at most 30%, at most 25%, at most 20%, or at most 15% in the subrange of from 250 nm to 270 nm, in the subrange of from 251 nm to 271 nm, in the subrange of from 252 nm to 272 nm, . . . , in the subrange of from 678 nm to 698 nm, in the subrange of from 679 nm to 699 nm and in the subrange of from 680 nm to 700 nm. In order to determine this average internal transmission, the transmission is measured for any wavelength starting from 250 nm in increments of 1 nm until 700 nm. Thus, transmission is measured at 250 nm, 251 nm, 252 nm, . . . , 698 nm, 699 nm and 700 nm. In total, the transmission is determined at 451 different wavelengths from 250 nm to 700 nm. The internal transmission is determined as ratio of the transmission as measured and the Pa value as described above. The average internal transmission is then determined for each of the 431 subranges indicated above as the mean value of the 21 internal transmission values in each of the subranges. At a sample thickness of 2 mm the average internal transmission in any subrange of 20 nm width within the range of from 250 nm to 700 nm may, for example, be at least 1%, at least 2%, at least 5% or at least 10%.

In some embodiments, the maximum internal transmission in the wavelength range of from 250 nm to 700 nm is comparably low. In some embodiments, the glass provided according to the present invention at a thickness of 2 mm has a maximum internal transmission for light of a wavelength in the range of from 250 nm to 700 nm of at most 50%, such as at most 45%, at most 40%, at most 35%, at most 30%, at most 25%, at most 20%, or at most 15%. In order to determine the maximum internal transmission, the transmission is measured for any wavelength starting from 250 nm in increments of 1 nm until 700 nm. Thus, transmission is measured at 250 nm, 251 nm, 252 nm, . . . , 698 nm, 699 nm and 700 nm. In total, the transmission is determined at 451 different wavelengths from 250 nm to 700 nm. The internal transmission is determined as ratio of the transmission as measured and the Pa value as described above. The maximum internal transmission in the range of from 250 nm to 700 nm is then determined as the maximum value of the 451 internal transmission values that have been determined. The glass provided according to the present invention at a thickness of 2 mm may, for example, have a maximum internal transmission for light of a wavelength in the range of from 250 nm to 700 nm of at least 1%, at least 2%, at least 5%, or even at least 10%.

The glasses provided according to the present invention do not only have a low internal transmission in the visible wavelength range but also a high internal transmission in the NIR wavelength range. Particularly relevant is the transmission in a range of from 850 nm to 950 nm.

In some embodiments, the glass provided according to the present invention at a thickness of 2 mm has an average internal transmission for light of a wavelength in the range of from 850 nm to 950 nm of at least 45%, such as at least 50%, at least 60%, at least 70%, at least 80%, at least 85%, at least 90%, at least 95%, at least 96%, at least 97%, at least 98%, at least 98.5%, or at least 99%. In order to determine this average internal transmission, the transmission is measured for any wavelength starting from 850 nm in increments of 1 nm until 950 nm. Thus, transmission is measured at 850 nm, 851 nm, 852 nm, . . . , 948 nm, 949 nm and 950 nm. In total, the transmission is determined at 101 different wavelengths from 850 nm to 950 nm. The internal transmission is determined as ratio of the transmission as measured and the Pa value as described above. The average internal transmission in the range of from 850 nm to 950 nm is then determined as the mean value of the 101 internal transmission values that have been determined. The glass provided according to the present invention at a thickness of 2 mm may, for example, have an average internal transmission for light of a wavelength in the range of from 850 nm to 950 nm of at most 99.9%, at most 99.5% or at most 99.25%.

In some embodiments, the average internal transmission in smaller wavelength regions within the range of from 850 nm to 950 nm is high. For example, at a sample thickness of 2 mm the average internal transmission in any subrange of 20 nm width within the range of from 850 nm to 950 nm may be at least 40%, such as at least 45%, at least 50%, at least 60%, at least 70%, at least 80%, at least 85%, at least 90%, at least 95%, at least 96%, at least 97%, at least 98%, or at least 98.5%. This means that the average internal transmission may be at least 40%, at least 45%, at least 50%, at least 60%, at least 70%, at least 80%, at least 85%, at least 90%, at least 95%, at least 96%, at least 97%, at least 98%, or at least 98.5% in the subrange of from 850 nm to 870 nm, in the subrange of from 851 nm to 871 nm, in the subrange of from 852 nm to 872 nm, . . . , in the subrange of from 928 nm to 948 nm, in the subrange of from 929 nm to 949 nm and in the subrange of from 930 nm to 950 nm. In order to determine this average internal transmission, the transmission is measured for any wavelength starting from 850 nm in increments of 1 nm until 950 nm. Thus, transmission is measured at 850 nm, 851 nm, 852 nm, . . . , 948 nm, 949 nm and 950 nm. In total, the transmission is determined at 101 different wavelengths from 850 nm to 950 nm. The internal transmission is determined as ratio of the transmission as measured and the Pa value as described above. The average internal transmission is then determined for each of the 81 subranges indicated above as the mean value of the 21 internal transmission values in each of the subranges. At a sample thickness of 2 mm the average internal transmission in any subrange of 20 nm width within the range of from 850 nm to 950 nm may, for example, be at most 99.9%, at most 99.5%, at most 99.1% or at most 99%.

In some embodiments, the minimum internal transmission in the wavelength range of from 850 nm to 950 nm is comparably high. In some embodiments, the glass provided according to the present invention at a thickness of 2 mm has a minimum internal transmission for light of a wavelength in the range of from 850 nm to 950 nm of at least 35%, such as at least 40%, at least 45%, at least 50%, at least 60%, at least 70%, at least 80%, at least 85%, at least 90%, at least 95%, at least 96%, at least 97%, at least 98%, or at least 98.5%. In order to determine the minimum internal transmission, the transmission is measured for any wavelength starting from 850 nm in increments of 1 nm until 950 nm. Thus, transmission is measured at 850 nm, 851 nm, 852 nm, . . . , 948 nm, 949 nm and 950 nm. In total, the transmission is determined at 101 different wavelengths from 850 nm to 950 nm. The internal transmission is determined as ratio of the transmission as measured and the Pa value as described above. The minimum internal transmission in the range of from 850 nm to 950 nm is then determined as the minimum value of the 101 internal transmission values that have been determined. The glass provided according to the present invention at a thickness of 2 mm may, for example, have a minimum internal transmission for light of a wavelength in the range of from 800 nm to 900 nm of at most 99.9%, at most 99.5%, at most 99.1% or at most 99%.

As described previously, the glass provided according to the present invention has a low internal transmission in the visible range.

In some embodiments, the glass provided according to the present invention at a thickness of 4 mm has an average internal transmission for light of a wavelength in the range of from 250 nm to 700 nm of at most 4%, such as at most 3.5%, at most 3%, at most 2.5%, at most 2%, at most 1.5%, at most 1.25%, at most 1%, at most 0.75%, or at most 0.5%. In order to determine this average internal transmission, the transmission is measured for any wavelength starting from 250 nm in increments of 1 nm until 700 nm. Thus, transmission is measured at 250 nm, 251 nm, 252 nm, . . . , 698 nm, 699 nm and 700 nm. In total, the transmission is determined at 451 different wavelengths from 250 nm to 700 nm. The internal transmission is determined as ratio of the transmission as measured and the Pa value as described above. The average internal transmission in the range of from 250 nm to 700 nm is then determined as the mean value of the 451 internal transmission values that have been determined. The glass provided according to the present invention at a thickness of 4 mm may, for example, have an average internal transmission for light of a wavelength in the range of from 250 nm to 700 nm of at least 0.01%, at least 0.02%, at least 0.05% or at least 0.1%.

In some embodiments, the average internal transmission in smaller wavelength regions within the range of from 250 nm to 700 nm is low. For example, at a sample thickness of 4 mm the average internal transmission in any subrange of 20 nm width within the range of from 250 nm to 700 nm may be at most 14%, such as at most 13%, at most 12%, at most 10%, at most 8%, at most 6%, or at most 5%. This means that the average internal transmission may be at most 14%, such as at most 13%, at most 12%, at most 10%, at most 8% at most 6%, or at most 5% in the subrange of from 250 nm to 270 nm, in the subrange of from 251 nm to 271 nm, in the subrange of from 252 nm to 272 nm, . . . , in the subrange of from 678 nm to 698 nm, in the subrange of from 679 nm to 699 nm and in the subrange of from 680 nm to 700 nm. In order to determine this average internal transmission, the transmission is measured for any wavelength starting from 250 nm in increments of 1 nm until 700 nm. Thus, transmission is measured at 250 nm, 251 nm, 252 nm, . . . , 698 nm, 699 nm and 700 nm. In total, the transmission is determined at 451 different wavelengths from 250 nm to 700 nm. The internal transmission is determined as ratio of the transmission as measured and the Pa value as described above. The average internal transmission is then determined for each of the 431 subranges indicated above as the mean value of the 21 internal transmission values in each of the subranges. At a sample thickness of 4 mm the average internal transmission in any subrange of 20 nm width within the range of from 250 nm to 700 nm may, for example, be at least 0.1%, at least 0.2%, at least 1%, at least 2% or at least 3%.

In some embodiments, the maximum internal transmission in the wavelength range of from 250 nm to 700 nm is comparably low. In some embodiments, the glass provided according to the present invention at a thickness of 4 mm has a maximum internal transmission for light of a wavelength in the range of from 250 nm to 700 nm of at most 25%, such as at most 24%, at most 23%, at most 22%, at most 20%, at most 15%, at most 14%, at most 13%, or at most 10%. In order to determine the maximum internal transmission, the transmission is measured for any wavelength starting from 250 nm in increments of 1 nm until 700 nm. Thus, transmission is measured at 250 nm, 251 nm, 252 nm, . . . , 698 nm, 699 nm and 700 nm. In total, the transmission is determined at 451 different wavelengths from 250 nm to 700 nm. The internal transmission is determined as ratio of the transmission as measured and the Pa value as described above. The maximum internal transmission in the range of from 250 nm to 700 nm is then determined as the maximum value of the 451 internal transmission values that have been determined. The glass provided according to the present invention at a thickness of 4 mm may, for example, have a maximum internal transmission for light of a wavelength in the range of from 250 nm to 700 nm of at least 0.5%, at least 1%, at least 2%, at least 4% or even at least 5%.

The glasses provided according to the present invention do not only have a low internal transmission in the visible wavelength range but also a high internal transmission in the NIR wavelength range. Particularly relevant is the internal transmission in a range of from 850 nm to 950 nm.

In some embodiments, the glass provided according to the present invention at a thickness of 4 mm has an average internal transmission for light of a wavelength in the range of from 850 nm to 950 nm of at least 20%, such as at least 25%, at least 30%, at least 35%, at least 40%, at least 50%, at least 60%, at least 70%, at least 80%, at least 85%, at least 90%, at least 95%, at least 96%, at least 97%, or at least 98%. In order to determine this average internal transmission, the transmission is measured for any wavelength starting from 850 nm in increments of 1 nm until 950 nm. Thus, transmission is measured at 850 nm, 851 nm, 852 nm, . . . , 948 nm, 949 nm and 950 nm. In total, the transmission is determined at 101 different wavelengths from 850 nm to 950 nm. The internal transmission is determined as ratio of the transmission as measured and the Pa value as described above. The average internal transmission in the range of from 850 nm to 950 nm is then determined as the mean value of the 101 internal transmission values that have been determined. The glass provided according to the present invention at a thickness of 4 mm may, for example, have an average internal transmission for light of a wavelength in the range of from 850 nm to 950 nm of at most 99.9%, at most 99.5%, at most 99% or at most 98.5%.

In some embodiments, the average internal transmission in smaller wavelength regions within the range of from 850 nm to 950 nm is high. For example, at a sample thickness of 4 mm the average internal transmission in any subrange of 20 nm width within the range of from 850 nm to 950 nm may be at least 20%, such as at least 25%, at least 30%, at least 35%, at least 40%, at least 50%, at least 60%, at least 70%, at least 80%, at least 85%, at least 90%, at least 95%, at least 96%, at least 97%, or at least 97.5%. This means that the average internal transmission may be at least 20%, such as at least 25%, at least 30%, at least 35%, at least 40%, at least 50%, at least 60%, at least 70%, at least 80%, at least 85%, at least 90%, at least 95%, at least 96%, at least 97%, or at least 97.5% in the subrange of from 850 nm to 870 nm, in the subrange of from 851 nm to 871 nm, in the subrange of from 852 nm to 872 nm, . . . , in the subrange of from 928 nm to 948 nm, in the subrange of from 929 nm to 949 nm and in the subrange of from 930 nm to 950 nm. In order to determine this average internal transmission, the transmission is measured for any wavelength starting from 850 nm in increments of 1 nm until 950 nm. Thus, transmission is measured at 850 nm, 851 nm, 852 nm, . . . , 948 nm, 949 nm and 950 nm. In total, the transmission is determined at 101 different wavelengths from 850 nm to 950 nm. The internal transmission is determined as ratio of the transmission as measured and the Pa value as described above. The average internal transmission is then determined for each of the 81 subranges indicated above as the mean value of the 21 internal transmission values in each of the subranges. At a sample thickness of 4 mm the average internal transmission in any subrange of 20 nm width within the range of from 850 nm to 950 nm may, for example, be at most 99.9%, at most 99%, at most 98.5% or at most 98%.

In some embodiments, the minimum internal transmission in the wavelength range of from 850 nm to 950 nm is comparably high. In some embodiments, the glass provided according to the present invention at a thickness of 4 mm has a minimum internal transmission for light of a wavelength in the range of from 850 nm to 950 nm of at least 15%, such as at least 20%, at least 25%, at least 30%, at least 35%, at least 40%, at least 50%, at least 60%, at least 70%, at least 80%, at least 85%, at least 90%, at least 95%, at least 96%, or at least 97%. In order to determine the minimum internal transmission, the transmission is measured for any wavelength starting from 850 nm in increments of 1 nm until 950 nm. Thus, transmission is measured at 850 nm, 851 nm, 852 nm, . . . , 948 nm, 949 nm and 950 nm. In total, the transmission is determined at 101 different wavelengths from 850 nm to 950 nm. The internal transmission is determined as ratio of the transmission as measured and the Pa value as described above. The minimum internal transmission in the range of from 850 nm to 950 nm is then determined as the minimum value of the 101 internal transmission values that have been determined. The glass provided according to the present invention at a thickness of 4 mm may, for example, have a minimum internal transmission for light of a wavelength in the range of from 800 nm to 900 nm of at most 99.5%, at most 99%, at most 98% or at most 97.5%.

As described above, the glasses provided according to the present invention have a high internal transmission in the NIR range and a low internal transmission in the visible range.

In some embodiments, at a sample thickness of 2 mm the ratio of the average internal transmission for light of a wavelength in the range of from 850 nm to 950 nm and the average internal transmission for light of a wavelength in the range of from 250 nm to 700 nm is in the range of from 6:1 to 200:1, such as from 7:1 to 150:1, from 8:1 to 100:1, from 10:1 to 80:1, from 12:1 to 60:1, from 15:1 to 50:1, from 18:1 to 40:1, or from 20:1 to 30:1.

In some embodiments, at a sample thickness of 2 mm the ratio of the lowest average internal transmission of all subranges of 20 nm width within the range of from 850 nm to 950 nm and the highest average internal transmission of all subranges of 20 nm width within the range of from 250 nm to 700 nm is in the range of from 2.5:1 to 20:1, such as from 2.6:1 to 15:1, from 2.7:1 to 10:1, from 2.8:1 to 9:1, from 2.9:1 to 8:1, from 3.0:1 to 7:1, from 3.1:1 to 6:1, from 3.2:1 to 5:1, from 3.3:1 to 4:1, or from 3.4:1 to 3.5:1.

In some embodiments, at a sample thickness of 2 mm the ratio of the minimum internal transmission for light of a wavelength in the range of from 850 nm to 950 nm and the maximum internal transmission for light of a wavelength in the range of from 250 nm to 700 nm is in the range of from 1.9:1 to 15:1, such as from 2.0:1 to 10:1, from 2.1:1 to 9:1, from 2.2:1 to 8:1, from 2.3:1 to 7:1, from 2.4:1 to 6:1, from 2.5:1 to 5:1, from 2.6:1 to 4:1, from 2.7:1 to 3.5:1, or from 2.8:1 to 3:1.

In some embodiments, at a sample thickness of 4 mm the ratio of the average internal transmission for light of a wavelength in the range of from 850 nm to 950 nm and the average internal transmission for light of a wavelength in the range of from 250 nm to 700 nm is in the range of from 20:1 to 400:1, such as from 25:1 to 300:1, from 30:1 to 250:1, from 40:1 to 200:1, from 50:1 to 150:1, from 60:1 to 140:1, from 70:1 to 130:1, or from 80:1 to 120:1.

In some embodiments, at a sample thickness of 4 mm the ratio of the lowest average internal transmission of all subranges of 20 nm width within the range of from 850 nm to 950 nm and the highest average internal transmission of all subranges of 20 nm width within the range of from 250 nm to 700 nm is in the range of from 6:1 to 50:1, such as from 6.5:1 to 40:1, from 7:1 to 30:1, from 7.5:1 to 25:1, from 8:1 to 20:1, from 8.5:1 to 18:1, from 9:1 to 15:1, from 9.5:1 to 14:1, from 10:1 to 13:1, or from 10.5:1 to 12:1.

In some embodiments, at a sample thickness of 4 mm the ratio of the minimum internal transmission for light of a wavelength in the range of from 850 nm to 950 nm and the maximum internal transmission for light of a wavelength in the range of from 250 nm to 700 nm is in the range of from 3.5:1 to 15:1, such as from 3.75:1 to 12:1, from 4.0:1 to 10:1, from 4.25:1 to 9:1, from 4.5:1 to 8:1, from 4.75:1 to 7.5:1, from 5.0:1 to 7:1, from 5.25:1 to 6.75:1, from 5.5:1 to 6.5:1, or from 5.75:1 to 6.25:1.

As described previously, the glasses provided according to the present invention have a particularly neutrally black color impression. The color impression can be quantified using the CIE UCS color space system of 1976. This system describes the color impression by the position in color space. There are three parameters to indicate the position in color space, namely the u' color coordinate, the v' color coordinate and the brightness Y. The skilled person is aware how to determine the position in CIE UCS color space of a given glass sample. The position in the CIE UCS color space system of 1976 may be determined according to DIN EN ISO 11664-5:2017-01. The standard colorimetric observer (also called 2° observer) is defined in ISO/CIE 11664-1: 2019-06. D65 is a CIE standard illuminant described in DIN EN ISO 11664-2:2011-07.

In particular, a low brightness Y may be very advantageous. In some embodiments, for a sample thickness of 4 mm and D65 illuminant the brightness Y is in an range of from 0 to <7, for example from 0.1 to 6.5, from 0.2 to 5, from 0.3 to 3, from 0.5 to 2, from 0.75 to 1.5, from 0 to 1.5, from 0 to 1.4, from 0 to 1.3, from 0 to 1.2 or even from 0 to 1.1.

In some embodiments, for a sample thickness of 4 mm and D65 illuminant the u' coordinate is in a range of from 0.07 to 0.4, such as 0.08 to 0.3 or 0.09 to 0.2, and the v' coordinate is in a range of from 0.09 to 0.51, such as from 0.1 to 0.51, from 0.15 to 0.51, from 0.2 to 0.51, from 0.21 to 0.50, from 0.22 to 0.48, for example from 0.25 to 0.48, from 0.3 to 0.48, from 0.35 to 0.48 or from 0.4 to 0.47, and the brightness Y may be in an range of from 0 to <7, for example from 0.1 to 6.5, from 0.2 to 5, from 0.3 to 3, from 0.5 to 2, from 0.75 to 1.5, from 0 to 1.5, from 0 to 1.4, from 0 to 1.3, from 0 to 1.2 or even from 0 to 1.1.

Exemplary embodiments provided according to the present invention also relate to glass articles comprising, and in some embodiments consisting of, the glass provided according to the present invention. In some embodiments, the glass article is a bandpass filter. In some embodiments, the glass article is an optical component in applications comprising NIR lasers. In some embodiments, the glass article is an optical component such as, for example, an optical window, in particular for a LiDAR system. In some embodiments, the glass article has a thickness in a range of from 1 to 5 mm, such as from 1.5 to 4.5 mm or from 2 to 4 mm.

Exemplary embodiments provided according to the present invention also relate to the use of the glass or glass article provided according to the present invention in a LiDAR system.

Exemplary embodiments provided according to the present invention also relate to a LiDAR system comprising a laser and an optical window positioned between the laser and the surrounding, the optical window comprising the glass or glass article provided according to the present invention.

Exemplary embodiments provided according to the present invention also relate to a method for producing a glass or glass article providing according to the present invention, the method including the steps of:
  melting glass raw materials,
  cooling the glass obtained.

In some embodiments, the method does not comprise oxygen bubbling. In some embodiments, the method does not comprise use of $NO_3$. In some embodiments, the method does neither comprise oxygen bubbling nor use of $NO_3$.

In particular if cations of chromium are present in the glass, very high melting temperatures may be avoided as this may be associated with generation of $Cr^{2+}$ that may compromise the high transmission in the NIR range. In some embodiments, melting temperatures are in a range of from 1410° C. to 1450° C., such as from 1415° C. to 1445° C., from 1420° C. to 1440° C., from 1425° C. to 1435° C., or about 1430° C.

EXAMPLES

Exemplary embodiments provided according to the present invention are further described by the following examples.

Glass Compositions

The following table shows the compositions of example glasses E1 to E5 provided according to the present invention and of comparative examples C1 and C2. The compositions are indicated in cat.-%. Thus, the relative molar proportions of the cations of the indicated components are given with regard to the total amount of cations in the glass.

| Component | E1 | E2 | E3 | E4 | E5 | C1 | C2 |
|---|---|---|---|---|---|---|---|
| Silicon | 45.2 | 61.9 | 61.8 | 67.0 | 63.1 | 62.3 | 63.3 |
| Aluminum | 1.0 | | | 0.03 | | | 2.3 |
| Boron | 9.1 | | | | | | 19.2 |

-continued

| Component | E1 | E2 | E3 | E4 | E5 | C1 | C2 |
|---|---|---|---|---|---|---|---|
| Sodium | 24.9 | 16.0 | 16.0 | 16.0 | 16.1 | 15.8 | 12.4 |
| Potassium | 13.2 | 10.9 | 11.0 | 10.1 | 10.0 | 10.6 | |
| Barium | 1.4 | | | | | | |
| Magnesium | | | | | | | 1.3 |
| Zinc | | 5.7 | 5.6 | 6.6 | 6.0 | 5.9 | |
| Lanthanum | 2.1 | | | | | | |
| Titanium | 1.7 | 3.4 | 3.5 | | 3.2 | 3.3 | 1.3 |
| Cerium | 0.7 | 1.4 | 1.5 | | 1.3 | 1.20 | |
| Manganese | 0.28 | 0.21 | 0.21 | | | 0.18 | |
| Nickel | 0.33 | 0.29 | 0.24 | | | 0.62 | |
| Chromium | 0.06 | | | 0.20 | 0.19 | | 0.14 |
| Cobalt | 0.11 | 0.13 | 0.15 | 0.08 | 0.08 | 0.06 | 0.08 |

Optical Properties

The transmission properties of the glasses provided according to the present invention were tested. In particular, samples of glasses E1 to E5 having a thickness of 2 mm and samples of glasses E1 to E5 having a thickness of 4 mm were analyzed.

Figure 2:
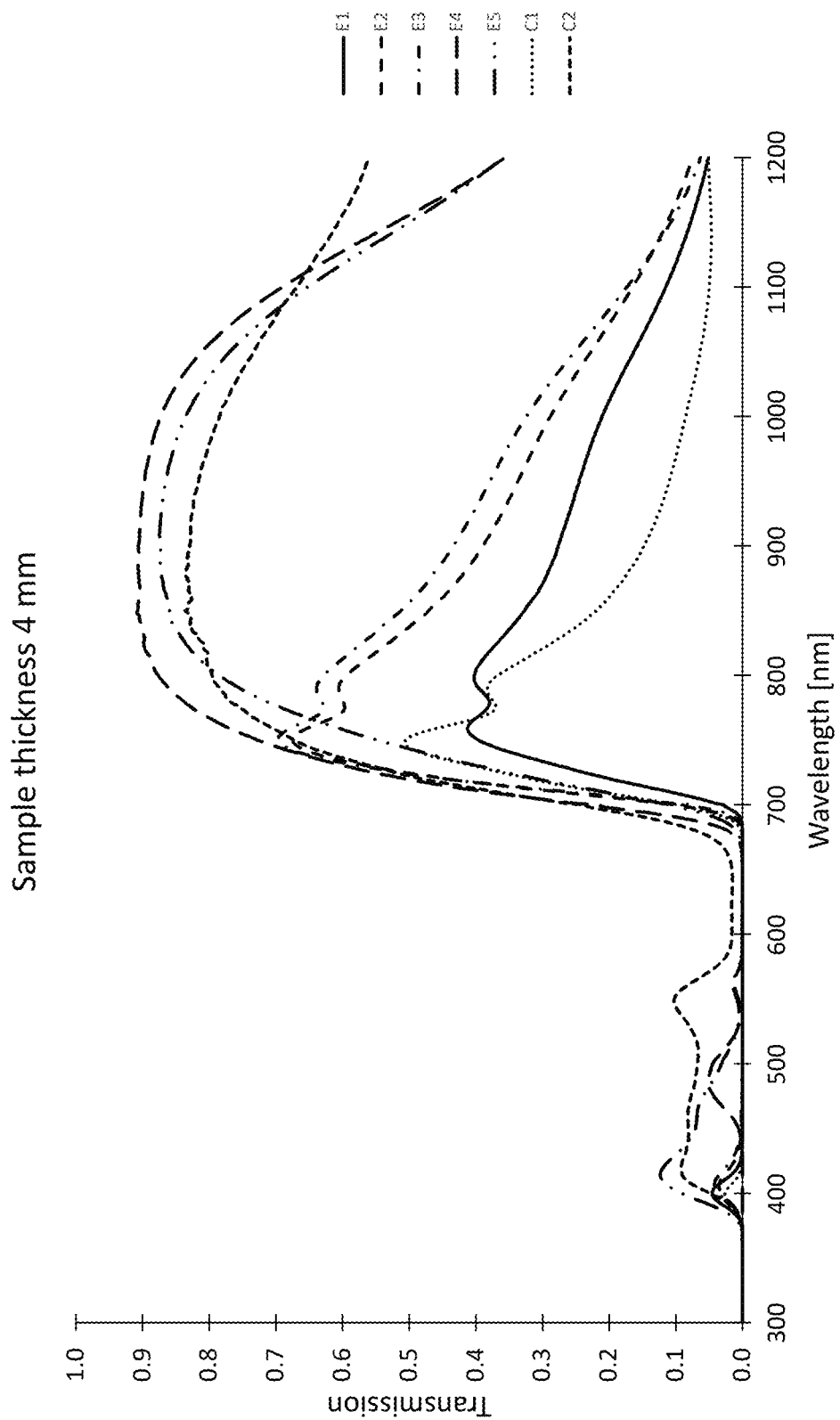
FIG. 2 illustrates the transmission of example glasses E1 to E5 as well as of comparative examples C1 and C2 in the wavelength range from 300 to 1200 nm for a sample thickness of 4 mm, with comparative example C1 having a comparably low transmission in the particularly relevant wavelength range of from 850 to 950 nm and comparative example C2 having a comparably high transmission in the visible range.

It was found that the glasses E1 to E5 have a low transmission in the visible range and a high transmission in the NIR range. Furthermore, they have a particularly neutrally black color impression. In contrast, the comparative examples C1 and C2 have impaired spectral properties as compared to E1 to E5. Exemplary transmission curves are shown in FIGS. 1 and 2. A detailed analysis of transmission properties is shown in the following.

Maximum and Minimum Transmission

The following tables show transmission properties of the glasses E1 to E5 provided according to the present invention and of comparative examples C1 and C2. In particular, the maximum transmission in the wavelength range from 250 to 700 nm and the minimum transmission in the wavelength range from 850 to 950 nm are shown. The transmission was measured for any wavelength in the indicated intervals in intervals of 1 nm and the maximum or minimum transmission, respectively, was determined. Furthermore, the ratio of the minimum transmission in the wavelength range from 850 to 950 nm and the maximum transmission in the wavelength range from 250 to 700 nm was calculated. The following tables present rounded transmission values. Therefore, the ratios as shown in the tables calculated based on the actual transmission values may slightly differ from the values that would be obtained by using the rounded transmission values for calculating the ratios.

The following table shows the results for samples having a thickness of 2 mm.

| | Maximum transmission in the wavelength range from 250 to 700 nm ($Max_{250-700\,nm}$) | Minimum transmission in the wavelength range from 850 to 950 nm ($Min_{850-950\,nm}$) | Ratio of $Min_{850-950\,nm}$ and $Max_{250-750\,nm}$ |
|---|---|---|---|
| E1 | 21% | 48% | 2.31 |
| E2 | 29% | 56% | 1.92 |
| E3 | 26% | 59% | 2.25 |
| E4 | 45% | 91% | 2.02 |
| E5 | 34% | 89% | 2.64 |
| C1 | 29% | 32% | 1.10 |
| C2 | 47% | 87% | 1.85 |

The following table shows the results for samples having a thickness of 4 mm.

| | Maximum transmission in the wavelength range from 250 to 700 nm ($Max_{250-700\,nm}$) | Minimum transmission in the wavelength range from 850 to 950 nm ($Min_{850-950\,nm}$) | Ratio of $Min_{850-950\,nm}$ and $Max_{250-750\,nm}$ |
|---|---|---|---|
| E1 | 5% | 24% | 5.36 |
| E2 | 9% | 34% | 3.68 |
| E3 | 8% | 38% | 5.05 |
| E4 | 22% | 90% | 4.09 |
| E5 | 12% | 86% | 6.97 |
| C1 | 9% | 11% | 1.21 |
| C2 | 24% | 82% | 3.41 |

For both a sample thickness of 2 mm and a sample thickness of 4 mm, the ratio of the minimum transmission in the wavelength range from 850 to 950 nm and the maximum transmission in the wavelength range from 250 to 700 nm was higher for the glasses provided according to the present invention as compared to comparative examples C1 and C2.

Furthermore, comparative example C1 had a very low minimum transmission in the wavelength range from 850 to 950 nm.

The values shown in the two tables above are values of total transmission. Notably, the Pa value was about 0.92 for the glasses E1 to E5 provided according to the present invention and for comparative examples C1 and C2. Thus, internal transmittance values can easily be calculated based on the total transmission values given above by dividing them by 0.92.

Average Transmission

The following tables show the average transmission in the wavelength range from 250 to 700 nm and the average transmission in the wavelength range from 850 to 950 nm. The transmission was measured for any wavelength in the indicated ranges in intervals of 1 nm and the average transmission was calculated as the mean of all measured transmission values within the respective range. Furthermore, the ratio of the average transmission in the wavelength range from 850 to 950 nm and the average transmission in the wavelength range from 250 to 700 nm was calculated.

The following table shows the results for samples having a thickness of 2 mm.

| | Average transmission in the wavelength range from 250 to 700 nm ($Mean_{250-700\,nm}$) | Average transmission in the wavelength range from 850 to 950 nm ($Mean_{850-950\,nm}$) | Ratio of $Mean_{850-950\,nm}$ and $Mean_{250-750\,nm}$ |
|---|---|---|---|
| E1 | 2.1% | 50.7% | 24.7 |
| E2 | 2.8% | 60.2% | 21.8 |
| E3 | 2.9% | 63.4% | 21.8 |
| E4 | 5.9% | 91.2% | 15.4 |
| E5 | 10.1% | 89.5% | 8.9 |
| C1 | 2.0% | 37.4% | 18.4 |
| C2 | 16.1% | 87.3% | 5.4 |

The following table shows the results for samples having a thickness of 4 mm.

| | Average transmission in the wavelength range from 250 to 700 nm ($Mean_{250-700\,nm}$) | Average transmission in the wavelength range from 850 to 950 nm ($Mean_{850-950\,nm}$) | Ratio of $Mean_{850-950\,nm}$ and $Mean_{250-750\,nm}$ |
|---|---|---|---|
| E1 | 0.3% | 27.9% | 95.9 |
| E2 | 0.4% | 39.4% | 102.3 |
| E3 | 0.4% | 43.8% | 104.6 |
| E4 | 1.2% | 90.4% | 78.3 |

-continued

| | Average transmission in the wavelength range from 250 to 700 nm (Mean$_{250-700\,nm}$) | Average transmission in the wavelength range from 850 to 950 nm (Mean$_{850-950\,nm}$) | Ratio of Mean$_{850-950\,nm}$ and Mean$_{250-750\,nm}$ |
|---|---|---|---|
| E5 | 2.4% | 87.0% | 36.3 |
| C1 | 0.3% | 15.3% | 50.9 |
| C2 | 4.3% | 82.8% | 19.1 |

For both a sample thickness of 2 mm and a sample thickness of 4 mm, the ratio of the average transmission in the wavelength range from 850 to 950 nm and the average transmission in the wavelength range from 250 to 700 nm was higher for the glasses provided according to the present invention as compared to comparative example C2. Furthermore, comparative example C1 had a very low average transmission in the wavelength range from 850 to 950 nm.

The values shown in the two tables above are values of total transmission. Notably, the Pa value was about 0.92 for the glasses E1 to E5 provided according to the present invention and for comparative examples C1 and C2. Thus, internal transmittance values can easily be calculated based on the total transmission values given above by dividing them by 0.92.

Average Transmission in Subranges

The transmission properties of the glasses provided according to the present invention were further analyzed by determining the average transmission in small subranges of 20 nm width within the relevant larger ranges of from 250 to 700 nm and from 850 to 950 nm, respectively. In order to determine the average transmission in such subranges, the transmission was measured for any wavelength of the larger ranges in intervals of 1 nm. The average transmission was then determined for each of the smaller subranges of 20 nm width within the larger ranges. For each of the example glasses, 431 subranges were analyzed for the range of from 250 to 700 nm and 81 subranges were analyzed for the range of from 850 to 950 nm.

The following tables show for each of the glasses the average transmission of the subrange having the highest average transmission of all subranges within the range of from 250 to 700 nm. Furthermore, the average transmission of the subrange having the lowest average transmission of all subranges within the range of from 850 to 950 nm is shown. For each of the glasses, the ratio of both values indicated above was determined. This ratio is also shown in the following tables. Average transmission of any subrange was determined as the mean value.

The following table shows the results for samples having a thickness of 2 mm.

| | Highest average transmission of subrange in the wavelength range from 250 to 700 nm (Subrange-Max$_{250-700\,nm}$) | Lowest average transmission of subrange in the wavelength range from 850 to 950 nm (Subrange-Min$_{850-950\,nm}$) | Ratio of Subrange-Min$_{850-950\,nm}$ and Subrange-Max$_{250-750\,nm}$ |
|---|---|---|---|
| E1 | 19% | 48% | 2.57 |
| E2 | 17% | 56% | 3.34 |
| E3 | 19% | 60% | 3.23 |
| E4 | 30% | 91% | 3.07 |
| E5 | 30% | 89% | 2.70 |
| C1 | 16% | 33% | 2.06 |
| C2 | 36% | 87% | 2.39 |

The following table shows the results for samples having a thickness of 4 mm.

| | Highest average transmission of subrange in the wavelength range from 250 to 700 nm (Subrange-Max$_{250-700\,nm}$) | Lowest average transmission of subrange in the wavelength range from 850 to 950 nm (Subrange-Min$_{850-950\,nm}$) | Ratio of Subrange-Min$_{850-950\,nm}$ and Subrange-Max$_{250-750\,nm}$ |
|---|---|---|---|
| E1 | 4% | 25% | 6.54 |
| E2 | 3% | 35% | 11.10 |
| E3 | 4% | 39% | 10.41 |
| E4 | 11% | 90% | 8.49 |
| E5 | 12% | 86% | 7.30 |
| C1 | 3% | 12% | 3.40 |
| C2 | 15% | 82% | 5.51 |

For both a sample thickness of 2 mm and a sample thickness of 4 mm, the ratio of the average transmission of the subrange having the lowest average transmission of all subranges within the range of from 850 to 950 nm and the average transmission of the subrange having the highest average transmission of all subranges within the range of from 250 to 700 nm was higher for the glasses provided according to the present invention as compared to comparative examples C1 and C2. Furthermore, comparative example C1 had a very low average transmission of the subrange having the lowest average transmission of all subranges within the range of from 850 to 950 nm.

The values shown in the two tables above are values of total transmission. Notably, the Pa value was about 0.92 for the glasses E1 to E5 provided according to the present invention and for comparative examples C1 and C2. Thus, internal transmittance values can easily be calculated based on the total transmission values given above by dividing them by 0.92.

Position in CIE UCS (1976) Color Space

Figure 3:
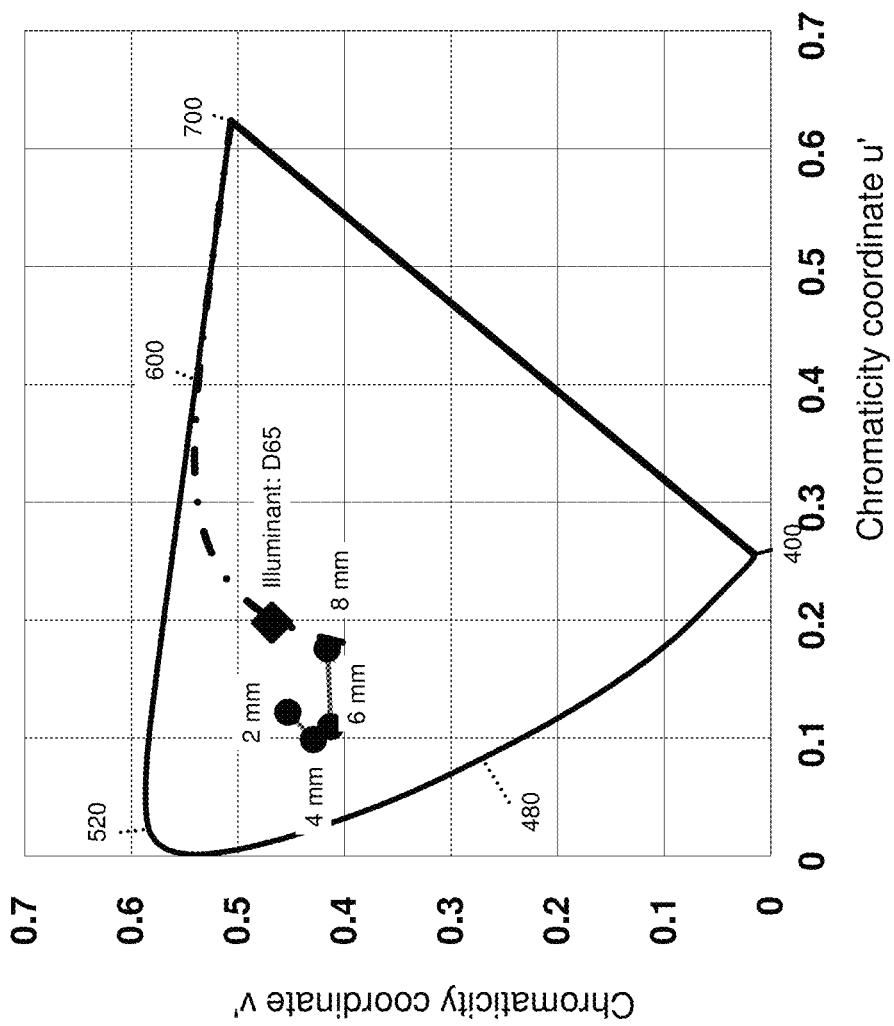
FIG. 3 illustrates a chromaticity diagram CIE UCS 1976 for glass E4 provided according to the present invention having a sample thickness of 2 mm, 4 mm, 6 mm and 8 mm, respectively, with the position of wavelength 400 nm, 480 nm, 520 nm, 600 nm and 700 nm being indicated and the position of a black body is indicated as a dashed line; it can be seen that E4 has a particularly neutrally black color position close to the black body with all indicated thicknesses.

The position in CIE UCS (1976) color space is shown in FIG. 3 for different sample thicknesses of example glass E4. The respective u' and v' coordinates and brightness Y are summarized in the following table.

| Thickness | u' coordinate | v' coordinate | Brightness Y |
|---|---|---|---|
| 2 mm | 0.122 | 0.453 | 8.2 |
| 4 mm | 0.099 | 0.429 | 1.0 |
| 6 mm | 0.110 | 0.413 | 0.2 |
| 8 mm | 0.176 | 0.416 | 0.0 |

As shown in FIG. 3, the color position is close to that of a black body. The glass has a particularly neutrally black color impression.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A glass, comprising cations of the following components in the indicated amounts (molar proportion in cat.-%):

| Component | Proportion (cat.-%) |
|---|---|
| Silicon | 30-80 |
| Boron | 0-20 |
| Aluminum | 0-2 |
| Sodium | 5-35 |
| Potassium | 2-25 |
| Nickel | 0-0.5 |
| Chromium | 0-0.5 |
| Cobalt | 0.03-0.5 |
| Iron | 0-1 | wherein a sum of the molar proportions of cations of sodium and potassium is in a range of from 15 to 50 cat.-%, a sum of the molar proportions of cations of nickel and chromium is in a range of from 0.1 to 0.5 cat.-%, and a ratio of the sum of the molar proportions of cations of sodium and potassium to the sum of the molar proportions of cations of nickel and chromium is in a range of from 70:1 to 200:1.

2. The glass of claim 1, wherein the glass comprises cations of zinc in an amount of from 1 to 12 cat.-%.

3. The glass of claim 1, wherein the glass is free of cations of arsenic.

4. The glass of claim 1, wherein a ratio of the molar proportion of potassium cations to the molar proportion of sodium cations in the glass is in a range of from 0.2:1 to <1:1.

5. The glass of claim 1, wherein the ratio of the sum of the molar proportions of cations of nickel and chromium to the molar proportion of cations of cobalt is in a range of from >1:1 to 5:1.

6. The glass of claim 1, wherein a ratio of the molar proportion of cations of manganese to the sum of the molar proportions of cations of nickel and chromium is in a range of from 0:1 to <1:1.

7. The glass of claim 1, wherein at a sample thickness of the glass of 2 mm a ratio of an average transmission for light of a wavelength in a range of from 850 nm to 950 nm and an average transmission for light of a wavelength in a range of from 250 nm to 700 nm is in a range of from 6:1 to 200:1.

8. The glass of claim 1, wherein at a sample thickness of the glass of 2 mm a ratio of a lowest average transmission of all subranges of 20 nm width within a range of from 850 nm to 950 nm and a highest average transmission of all subranges of 20 nm width within a range of from 250 nm to 700 nm is in a range of from 2.5:1 to 20:1.

9. The glass of claim 1, wherein at a sample thickness of the glass of 2 mm a ratio of a minimum transmission for light of a wavelength in a range of from 850 nm to 950 nm and a maximum transmission for light of a wavelength in a range of from 250 nm to 700 nm is in a range of from 1.9:1 to 15:1.

10. The glass of claim 1, wherein at a sample thickness of the glass of 4 mm a ratio of an average transmission for light of a wavelength in a range of from 850 nm to 950 nm and an average transmission for light of a wavelength in a range of from 250 nm to 700 nm is in a range of from 20:1 to 400:1.

11. The glass of claim 1, wherein at a sample thickness of the glass of 4 mm a ratio of a lowest average transmission of all subranges of 20 nm width within a range of from 850 nm to 950 nm and a highest average transmission of all subranges of 20 nm width within a range of from 250 nm to 700 nm is in a range of from 6:1 to 50:1.

12. The glass of claim 1, wherein at a sample thickness of the glass of 4 mm a ratio of a minimum transmission for light of a wavelength in a range of from 850 nm to 950 nm and a maximum transmission for light of a wavelength in a range of from 250 nm to 700 nm is in a range of from 3.5:1 to 15:1.

13. The glass of claim 1, wherein at a sample thickness of the glass of 4 mm and for D65 illuminant a u' coordinate is in a range of from 0.07 to 0.4, a v' coordinate is in a range of from 0.09 to 0.51, and a brightness Y is in a range of from 0 to <7 in the 1976 CIE UCS color space system.

14. A system, comprising:
a glass article comprising a glass and having a thickness in a range of from 1 mm to 5 mm, the glass comprising cations of the following components in the indicated amounts (molar proportion in cat.-%):

| Component | Proportion (cat.-%) |
|---|---|
| Silicon | 30-80 |
| Boron | 0-20 |
| Aluminum | 0-2 |
| Sodium | 5-35 |
| Potassium | 2-25 |
| Nickel | 0-0.5 |
| Chromium | 0-0.5 |
| Cobalt | 0.03-0.5 |
| Iron | 0-1 | wherein a sum of the molar proportions of cations of sodium and potassium is in a range of from 15 to 50 cat.-%, a sum of the molar proportions of cations of nickel and chromium is in a range of from 0.1 to 0.5 cat.-%, and a ratio of the sum of the molar proportions of cations of sodium and potassium to the sum of the molar proportions of cations of nickel and chromium is in a range of from 70:1 to 200:1.

15. The system of claim 14, wherein the glass comprises cations of zinc in an amount of from 1 to 12 cat.-%.

16. The system of claim 14, wherein a ratio of the molar proportion of potassium cations to the molar proportion of sodium cations in the glass is in a range of from 0.2:1 to <1:1.

17. The system of claim 14, wherein the ratio of the sum of the molar proportions of cations of nickel and chromium to the molar proportion of cations of cobalt is in a range of from >1:1 to 5:1.

18. The system of claim 14, wherein a ratio of the molar proportion of cations of manganese to the sum of the molar proportions of cations of nickel and chromium is in a range of from 0:1 to <1:1.

19. The system of claim 14, wherein at a sample thickness of the glass of 2 mm a ratio of an average transmission for light of a wavelength in a range of from 850 nm to 950 nm and an average transmission for light of a wavelength in a range of from 250 nm to 700 nm is in a range of from 6:1 to 200:1.

20. The system of claim 14, wherein the system is a light detection and ranging (LiDAR) system further comprising a laser and an optical window positioned between the laser and a surrounding, wherein the optical window comprises the glass article.

* * * * *